US011312548B2

(12) United States Patent
Silsby et al.

(10) Patent No.: US 11,312,548 B2
(45) Date of Patent: Apr. 26, 2022

(54) DRINK CONTAINER AND LEAK PROOF PLUG LID FOR USE THEREWITH

(71) Applicant: Pacific Market International, LLC, Seattle, WA (US)

(72) Inventors: Jacob D. Silsby, Seattle, WA (US); Ping The Phan, Shoreline, WA (US)

(73) Assignee: Pacific Market International, LLC, Seattle, WA (US)

( * ) Notice: Subject to any disclaimer, the term of this patent is extended or adjusted under 35 U.S.C. 154(b) by 0 days.

(21) Appl. No.: 16/418,746

(22) Filed: May 21, 2019

(65) Prior Publication Data

US 2020/0369444 A1 Nov. 26, 2020

(51) Int. Cl.
*B65D 41/00* (2006.01)
*B65D 47/30* (2006.01)
*A47G 19/22* (2006.01)
*B65D 23/10* (2006.01)
*B65D 43/02* (2006.01)
*B65D 81/38* (2006.01)

(52) U.S. Cl.
CPC ......... *B65D 47/30* (2013.01); *A47G 19/2272* (2013.01); *B65D 23/104* (2013.01); *B65D 43/022* (2013.01); *B65D 81/3841* (2013.01)

(58) Field of Classification Search
CPC .... B65D 47/30; B65D 23/104; B65D 43/022; B65D 81/3841; A47G 19/2272
USPC ............... 220/231, 233, 234, 238; 215/359
See application file for complete search history.

(56) References Cited

U.S. PATENT DOCUMENTS

| 2,199,964 | A | 5/1940 | Rook | |
| 2,685,380 | A * | 8/1954 | Moeller | B65D 39/12 215/359 |
| 4,930,657 | A | 6/1990 | Walker | |
| 6,443,336 | B2 | 9/2002 | Antonetti et al. | |
| 8,186,527 | B2 * | 5/2012 | Liu | B65D 39/12 215/317 |
| 9,708,108 | B2 | 7/2017 | Gregory et al. | |

(Continued)

FOREIGN PATENT DOCUMENTS

| AU | 440884 B2 | 9/1973 |
| DE | 78568 C | 7/1893 |

(Continued)

OTHER PUBLICATIONS

Camelback Brook, 7 pages, product publicly disclosed on year prior to May 21, 2019.

(Continued)

*Primary Examiner* — Don M Anderson
*Assistant Examiner* — Elizabeth J Volz
(74) *Attorney, Agent, or Firm* — George C. Rondeau, Jr.; Davis Wright Tremaine, LLP

(57) ABSTRACT

A drink container and three position plug lid for use therewith. The lid includes a tubular seal with a flexible perimeter seal wall attached between upper and lower seal carriers, a lifter member attached to the lower seal carrier and a cam member to control movement of the lower seal carrier relative to the upper seal carrier and thereby laterally flex and axially move the perimeter seal wall and move the lid between closed and opened positions where the lid is retained within the drink container against removal, and a removal position permitting removal of the lid for washing the lid and drink container.

55 Claims, 30 Drawing Sheets

(56) References Cited

U.S. PATENT DOCUMENTS

| | | |
|---|---|---|
| 2010/0200602 A1 | 8/2010 | Chan |
| 2013/0037540 A1 | 2/2013 | Sze |
| 2013/0313219 A1 | 11/2013 | Pao |
| 2018/0050846 A1 | 2/2018 | Shao |

FOREIGN PATENT DOCUMENTS

| | | |
|---|---|---|
| DE | 517386 C | 2/1931 |
| DE | 1532446 A1 | 6/1970 |
| DE | 3312915 A1 | 10/1984 |

OTHER PUBLICATIONS

Revomax Twist Free, 3 pages, product publicly disclosed on year prior to May 21, 2019.
U.S. Appl. No. 16/418,800, filed May 21, 2019.

* cited by examiner

US 11,312,548 B2

DRINK CONTAINER AND LEAK PROOF PLUG LID FOR USE THEREWITH

FIELD OF INVENTION

The present invention relates to drink containers and removable lids for use therewith, and more precisely to plug lids.

BACKGROUND

Drink containers or drinking vessels with lids having sealing mechanisms are known in the art. Many require the lid to be threadably attached to a drink container body. One disadvantage of threadably attached lids is the time, effort and motion required to attach or remove the lid from the drink container body, and also the difficulty of doing so in some situations. Known plug lids overcome some of these issues, but generally do not permit drinking from the drinking container unless the plug lid is fully removed from the drinking container. A sealing problem exists with some plug lid designs when used with drink container bodies having variations in the interior diameter of the bodies, thus requiring a lid with a wide size tolerance to insure a good fluid-tight seal with the interior wall of the container body.

DETAILED DESCRIPTION

Figure 1:
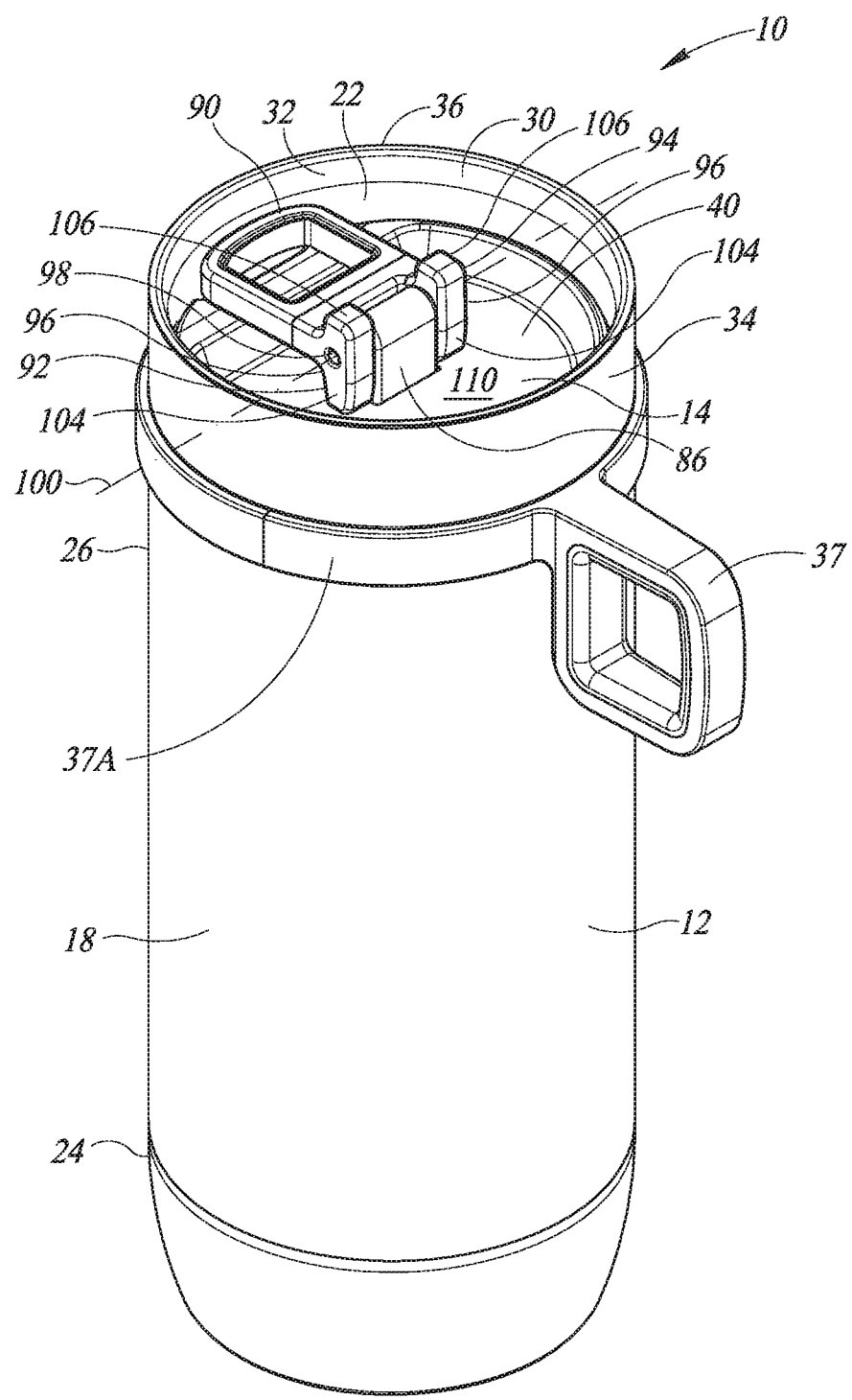
FIG. 1 is a top perspective view of a drink container with a plug lid in a first operational position.
Figure 1A:
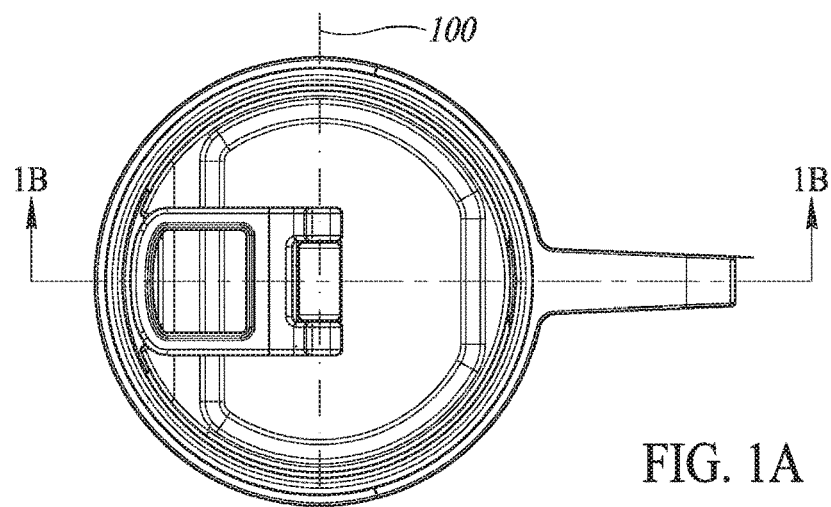
FIG. 1A is a top plan view of the drink container of FIG. 1.

A drinking vessel or drink container 10 in accordance with the present embodiment is shown in FIGS. 1-8. The drink container 10 includes a substantially cylindrical body 12 and a lid 14. The illustrated body 12 has a double wall construction for improved thermal insulation, using an inner body 16 positioned and secured within an outer body 18. In other embodiments not shown, a single wall construction may be used.

The inner body 16 has a lower inner body portion 20 and an upper inner body portion 22 forming a hollow interior chamber 19. The outer body 18 has a lower outer body portion 24 and an upper outer body portion 26. A drinkable liquid (not shown) may be stored in the lower inner body portion 20 when the drink container 10 is in an upright position. The upper inner body portion 22 defines an interior fluid passageway 28 having a longitudinal axis 29, and an upper end opening 30 at an upper end of the body 12 through which the liquid stored in lower inner body portion 20 may flow for drinking or pouring when the drink container 10 is sufficiently tilted. An upper end portion 32 of the upper inner body portion 22 and an upper end portion 34 of the upper outer body portion 26 are joined at their upper ends to define a drinking lip 36 at the upper end of the body 12 which the lips of a user may be placed for drinking the liquid stored in lower inner body portion 20 when the drink container 10 is sufficiently tilted. A handle 37 is attached to the body 12 by a ring portion 37A which extends about the upper outer body portion 26 to facilitate the user holding the drink container 10.

The upper inner body portion 22 has an interior, circumferentially extending body inward protrusion or body ridge 38 projecting inward within the fluid passageway 28. The body ridge 38 extends continuously about the circumference of the upper inner body portion 22. The body ridge 38 has a circumferentially extending upper wall portion 38A which slopes downward in the inward direction, and a circumferentially extending lower wall portion 38B which slopes upward in the inward direction. As will be described, the body ridge 38 serves as a stop to support the lid 14 when within the fluid passageway 28 and limit its downward movement within the fluid passageway. In alternative embodiments not illustrated, the body ridge 38 may not be continuous.

The lid 14 is a plug-type closure which is insertable by the user into the fluid passageway 28 through the upper end opening 30 for use of the drink container 10 for storing, transporting and drinking a liquid, and removable therefrom when desired by the user for washing the lid and/or body 12 of the drink container. The lid 14 may be operated to move between three states, a closed and securely retained state as shown in FIGS. 1, 1A, 1B and 1C, an opened but retained state as shown in FIGS. 2, 2A, 2B and 2C, and an opened and removable state as shown in FIGS. 3, 3A, 3B, 3C, 4 and 5. In the closed and securely retained state shown in FIGS. 1, 1A, 1B and 1C, the fluid passageway 28 is closed so no liquid can be drunk from the drink container 10 and the lid 14 cannot be removed from the body 12 (or inserted into the fluid passageway). In the opened but retained state shown in FIGS. 2, 2A, 2B and 2C, the lid 14 is opened for drinking but retained within the fluid passageway 28 against unintended removal. In the opened and removable state shown in FIGS. 3, 3A, 3B, 3C, 4 and 5, the lid 14 is opened but not retained within the fluid passageway 28 so as to be removable by the user for filling the lower inner body portion 20 with a liquid or for washing the lid and/or the body 12. The individual component parts of the drink container 10 are separately illustrated in the exploded views of FIGS. 6, 7 and 8.

The lid 14 includes an upper seal carrier 40, a lower seal carrier 42 and a flexible tubular seal 44. The upper seal carrier 40 has an upper portion 40A and a smaller diameter lower portion 40B. The upper portion 40A of the upper seal carrier 40 is sized to engage and be supported by the body ridge 38 when the lid 14 is inserted by the user into the fluid passageway 28 through the upper end opening 30, while the lower seal carrier 42 is smaller and sized to pass by the body ridge 38 and reside within the fluid passageway below the body ridge. When the lid 14 is positioned within the fluid passageway 28, the upper seal carrier 40, the lower seal carrier 42 and tubular seal 44 are coaxially arranged within the fluid passageway 28. The upper seal carrier 40 and the lower seal carrier 42 are axially spaced apart and each extend transverse to the longitudinal axis 29. As will be described in greater detail below, the lower seal carrier 42 is axially movable relative to the upper seal carrier 40 within the fluid passageway 28.

The tubular seal 44 has the shape of a bellows with a single convolution and may be made of a soft silicon material. The tubular seal 44 has a circumferential upper end portion 46 sealingly attached to the upper seal carrier 40 and a circumferential lower end portion 48 sealingly attached to the lower seal carrier 42. The tubular seal 44 has a thin perimeter sidewall 44A and a hollow interior space 44B located within the perimeter sidewall and extending the full length of the tubular seal upper and lower end portions 46 and 48. The interior space 44B spans a substantial portion of the interior cross-sectional area of the fluid passageway 28, in the illustrated embodiment when in the opened and removable state shown in FIGS. 3, 3A, 3B, 4 and 5, the interior space spans approximately 93% of the interior cross-sectional area of the fluid passageway, and preferably spans at least 50% of the interior cross-sectional area of the fluid passageway. While the tubular seal 44 is illustrated as having a generally tubular shaped flexible perimeter sidewall 44A and the hollow interior space 44B as extending fully between its upper and lower end portions 46 and 48, the sidewall and interior space may have other shapes and configurations.

When the lid 14 is positioned within the within the fluid passageway 28, the upper portion 40A of the upper seal carrier 40 is positioned above and in engagement with an upper portion of the body ridge 38 of the upper inner body portion 22 of the body 12, which supports the upper seal carrier and prevents further downward movement of the lid within the fluid passageway. When the lid 14 is so positioned, a perimeter sidewall 50 of the upper portion 40A of the upper seal carrier 40 is positioned adjacent to an upper interior wall surface portion 52 of the upper inner body portion 22, except for a drink dispensing aperture 54 formed by an inwardly recessed region at the perimeter of the upper portion of the upper seal carrier through which liquid may pass for drinking when the drink container 10 is sufficiently tilted and the lid is in the opened but retained state as shown in FIGS. 2, 2A, 2B and 2C, or the opened and removable state as shown in FIGS. 3, 3A, 3B and 3C (although when in the opened and removable state the lid is not securely retained within the fluid passageway).

When the lid 14 is positioned within the fluid passageway 28 with the upper portion 40A of the upper seal carrier 40 positioned above and engagement with the body ridge 38, a perimeter sidewall 56 of the lower seal carrier 42 is positioned inward away from a lower interior wall surface portion 58 of the upper inner body portion 22. This forms a circumferentially extending, perimeter fluid flow pathway 60 between the perimeter sidewall 56 and the lower interior wall surface 58 through which liquid may pass for drinking when the drink container 10 is sufficiently tilted.

The lower portion 40B of the upper seal carrier 40 has a perimeter sidewall 62 and is positioned within an upper edge portion 64 of the upper end portion 46 of the tubular seal 44. The perimeter sidewall 62 of the lower portion 40B of the upper seal carrier 40 has a circumferential extending outward facing protrusion 66 over which the upper edge portion 64 of the tubular seal 44 extends to position the protrusion 66 in a circumferentially extending inward facing groove 68 of the upper edge portion to sealingly secure the upper edge portion to the upper seal carrier 40.

The perimeter sidewall 50 of the upper portion 40A of the upper seal carrier 40 has a circumferentially extending outward facing groove 70 in which a circumferentially extending seal 72 is positioned to provide a fluid-tight seal between the upper seal carrier 40 and the upper interior wall surface portion 52 of the upper inner body portion 22 when the lid 14 is positioned within the within the fluid passageway 28, except at the drink dispensing aperture 54.

The lower seal carrier 42 is positioned at least partially within a lower edge portion 74 of the lower end portion 48 of the tubular seal 44. The perimeter sidewall 56 of the lower seal carrier 42 includes a circumferentially extending outward facing slot 76 in which an end portion 75 of the lower edge portion 74 is positioned and secured to sealingly secure the lower edge portion 74 to the lower seal carrier 42.

A midportion 77 of the tubular seal 44 has a circumferentially, outwardly projecting extending bulge which is mostly positioned below the upper seal carrier 40 and the body ridge 38. The midportion 77 has a circumferentially extending upper wall portion 77A and a circumferentially extending lower wall portion 77B. When the midportion 77 is compress by moving the lower seal carrier 42 upward to be closer to the upper seal carrier 40, as will be described in greater detail below, the upper and lower wall portions 77A and 77B move closer together, and the upper wall portion 77A moves closer to the body ridge 38. In the closed and securely retained state shown in FIGS. 1, 1A, 1B and 1C, the upper wall portion 77A is pressed against the body ridge 38 to provide a fluid-tight seal therebetween and close the fluid passageway 28, thus preventing fluid stored in the lower inner body portion 20 from flowing upward through the fluid pathway 60 to the drink dispensing aperture 54 even when the drinking container is tilted. In the illustrated embodiment, the upper wall portion 77A presses against the lower wall portion 38B of the body ridge 38.

A connector member 78 has an exteriorly threaded base portion 79 which is threadably received in an interiorly threaded central opening 80 of the lower seal carrier 42 for axial movement of the connector member with axial movement of the lower seal carrier. The connector member 78 has a lifter member 82 located inward of the perimeter sidewall 44A of the tubular seal and within the interior space 44B, and which projects axially upward from the lower seal carrier 42 and through a central aperture 84 in the upper seal carrier 40. An upper end portion 86 of the lifter member 82 extends above the upper seal carrier 40 and has a transverse lifter member bore 88.

A cam member 90 is positioned about the upper seal carrier 40 and has a pair of spaced apart cam portions 92 and 94 located at a lower end thereof. The upper end portion 86 of the lifter member 82 is positioned between the cam portions 92 and 94. The cam portions 92 and 94 each have a transverse cam portion bore 96 which axially aligns with the lifter member bore 88. A pivot pin 98 extends through the cam portion bores 96 and the lifter member bore 88 to rotatably attach the cam member 90 to the upper end portion 86 of the lifter member 82 to permit rotation of the cam member 90 about a transverse axis of rotation 100.

The cam member 90 has a handle portion 102 to which the cam portions 92 and 94 of the cam member are rigidly attached for rotation with the handle portion. Each of the cam portions 92 and 94 has a first cam 104 and a second cam 106 extending in opposite directions away from the handle portion 102 transverse to the pivot pin 98, with both of the first cams 104 extending to one side of the handle portion and both of the second cams 106 extending to an opposite side of the handle portion. The first cam 104 is longer than the second cam 106 to provide a greater amount of lift than the second cam. The handle portion 102 is rotatable about the pivot pin 98 between a first rotational/operational position shown in FIGS. 1, 1A, 1B and 1C, a second rotational/operational position shown in FIGS. 2, 2A, 2B and 2C, and a third rotational/operational position shown in FIGS. 3, 3A, 3B and 3C. The third rotational/operational position of the handle portion 102 is located between the first and second rotational/operational positions of the handle portion. Rotation of the handle portion 102 directly produces rotation of the first and second cams 104 and 106. The handle portion 102 projects away from the cam portions 92 and 94 and provides a grip for grasping by a user for rotation of the cam member 90 about the pivot pin 98 and rotation of the handle portion 102 between its first, second and third rotational/operational positions. The handle portion 102 has a central aperture 108 sized to allow at least one finger of the user to fit therethrough to facilitate grasping of the handle portion for rotation of the cam member 90 or for removal of the lid 14 from the fluid passageway 28 and insertion of the lid into the fluid passageway.

Figure 3:
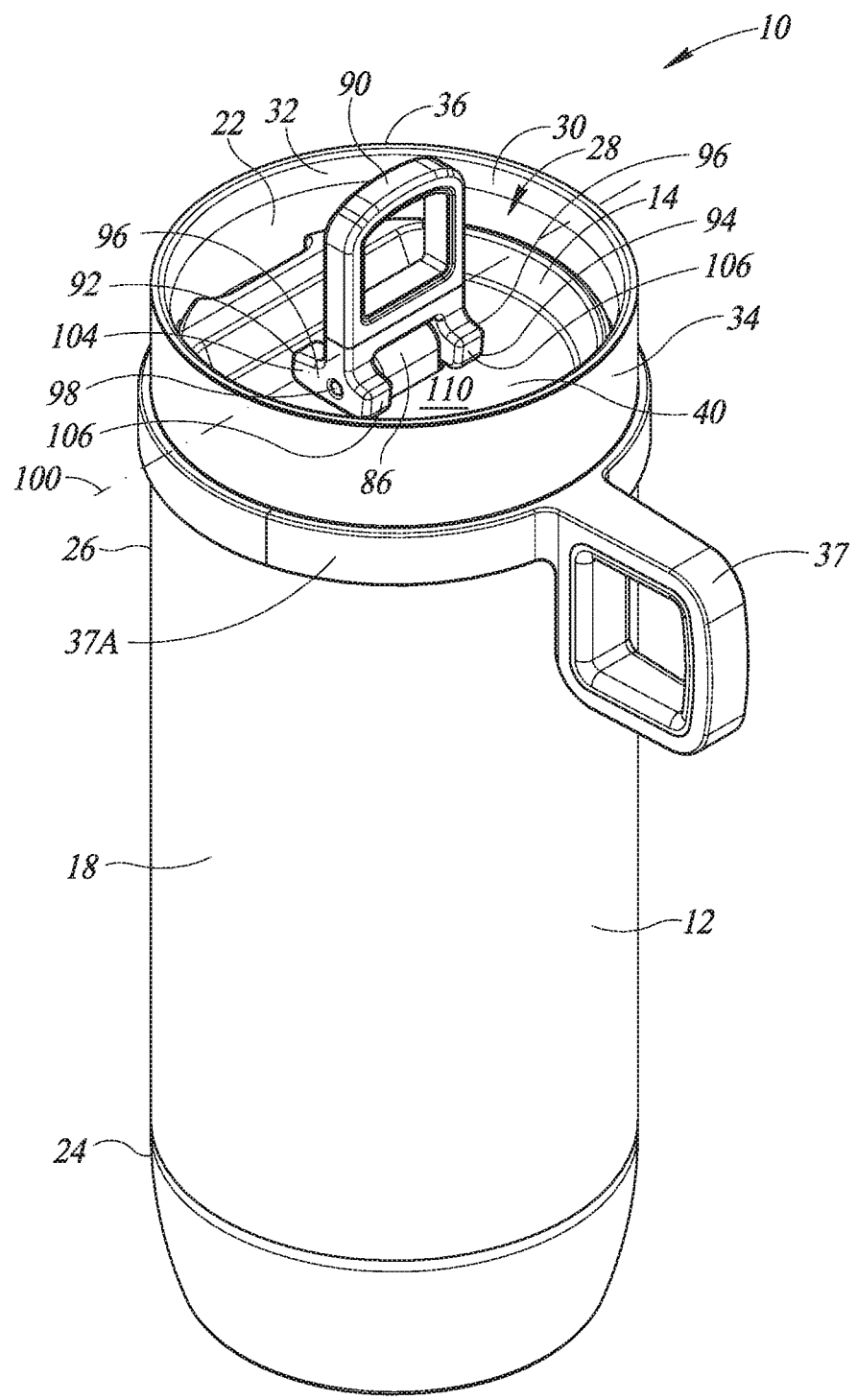
FIG. 3 is a top perspective view of the drink container lid of FIG. 1 with the plug lid in a third operational position.
Figure 3A:
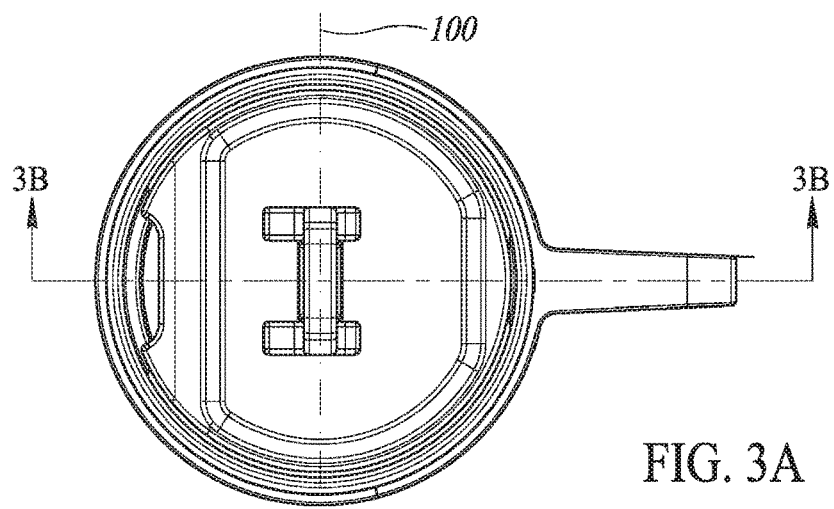
FIG. 3A is a top plan view of the drink container lid of FIG. 3.
Figure 3B:
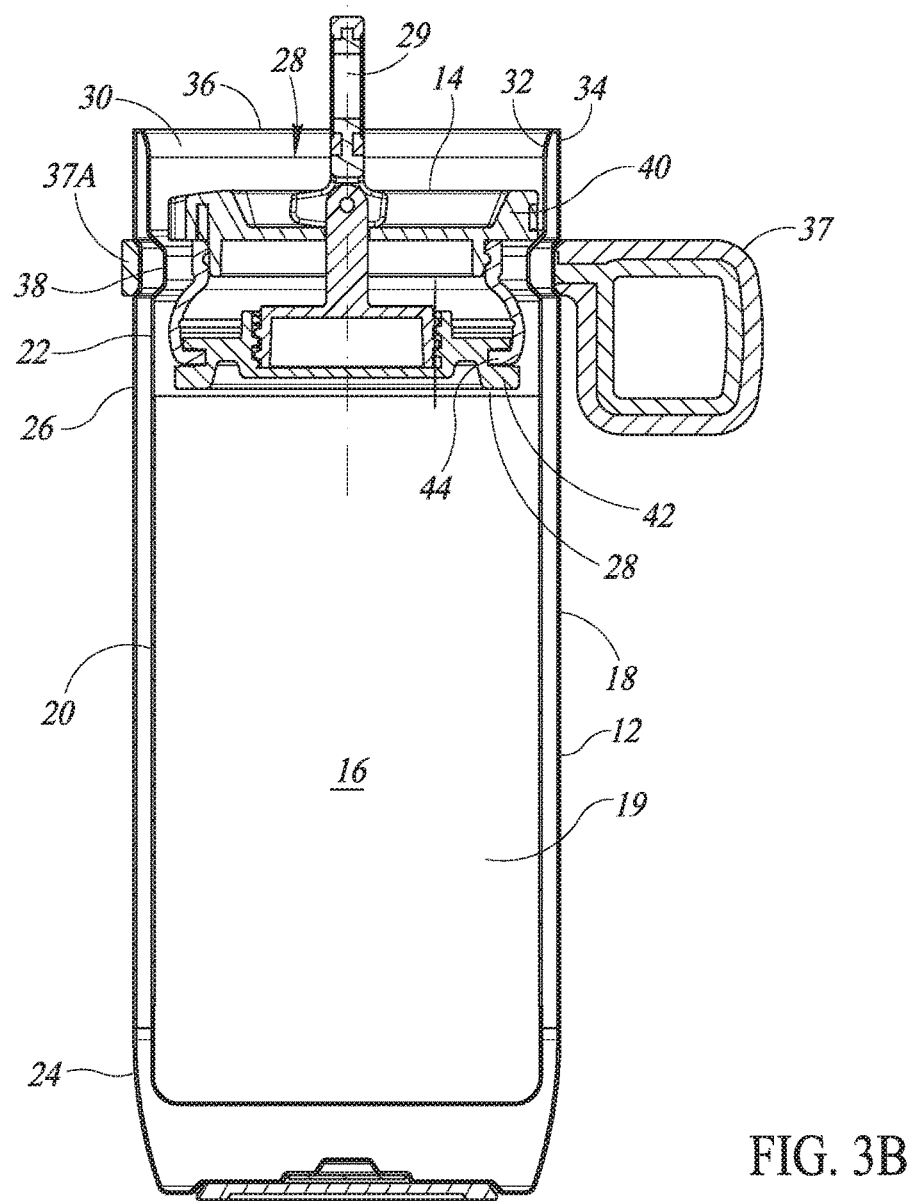
FIG. 3B is a cross-sectional view of the drink container lid of FIG. 3 taken substantially along the line 3B-3B of FIG. 3A.
Figure 3C:
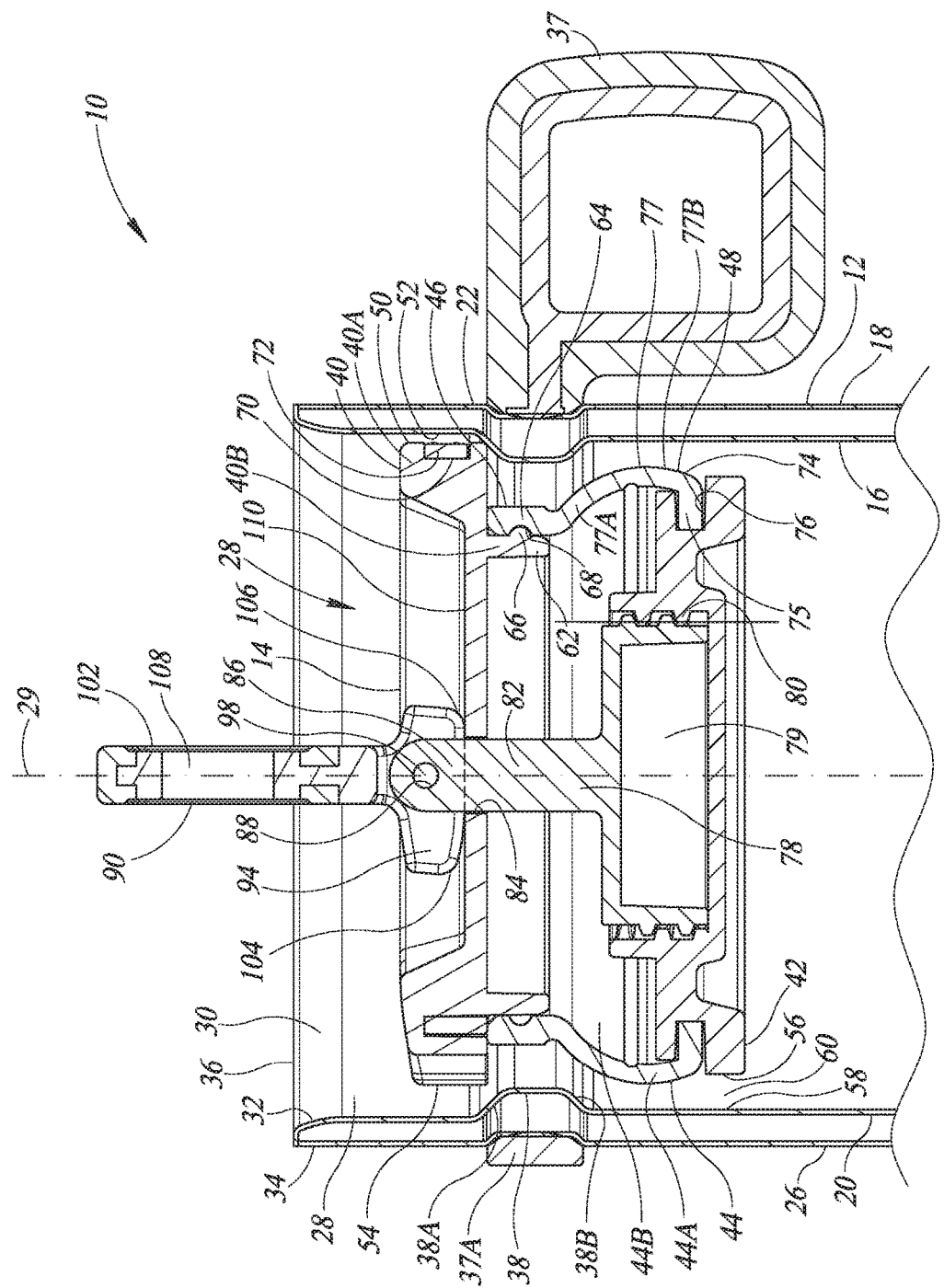
FIG. 3C is a partial enlargement of FIG. 3B.
Figure 4:
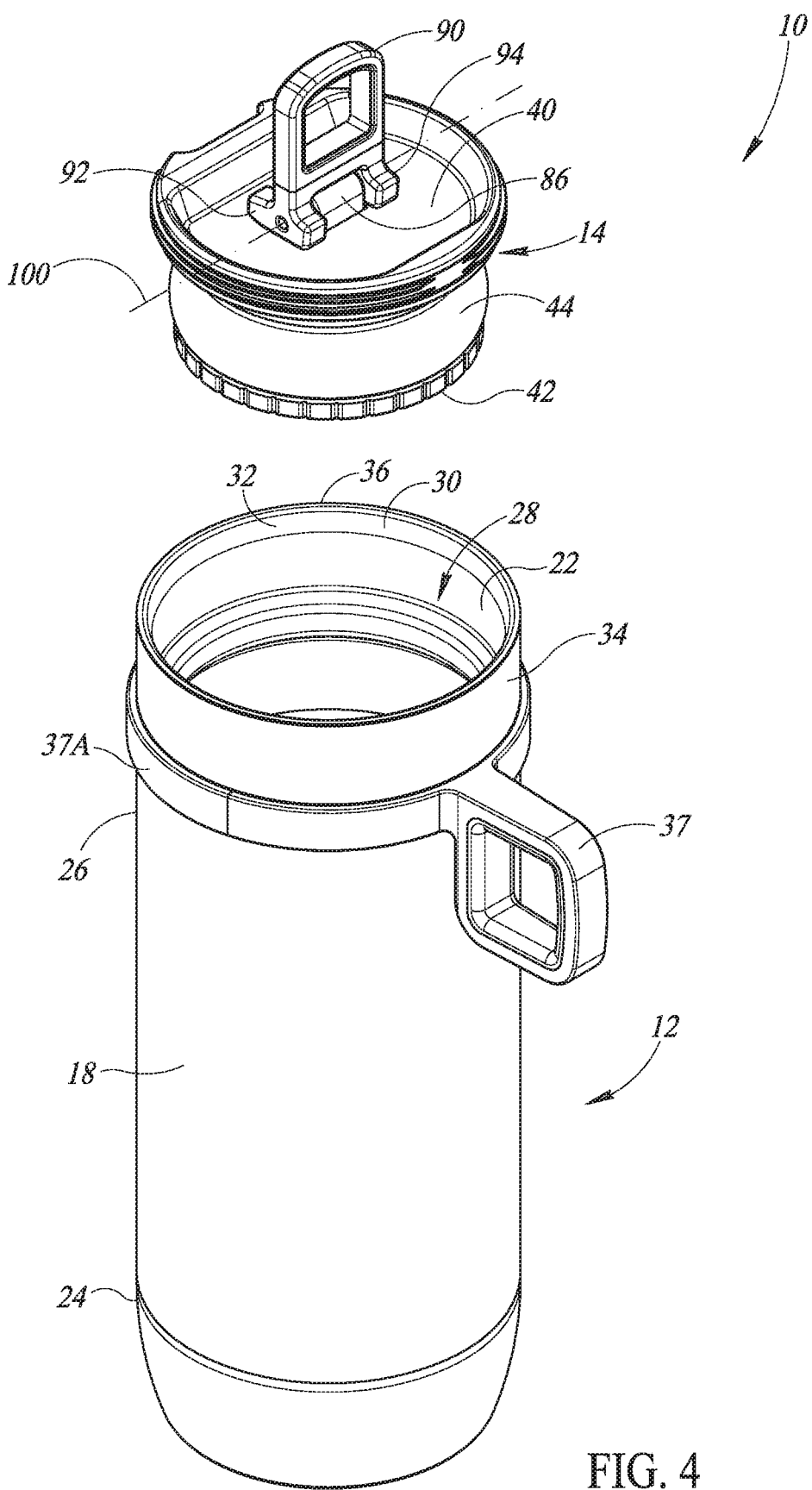
FIG. 4 is a top perspective view of the drink container of FIG. 1 with the plug lid in the third operational position shown in FIG. 3 and removed from a body of the drinking container.
Figure 5:
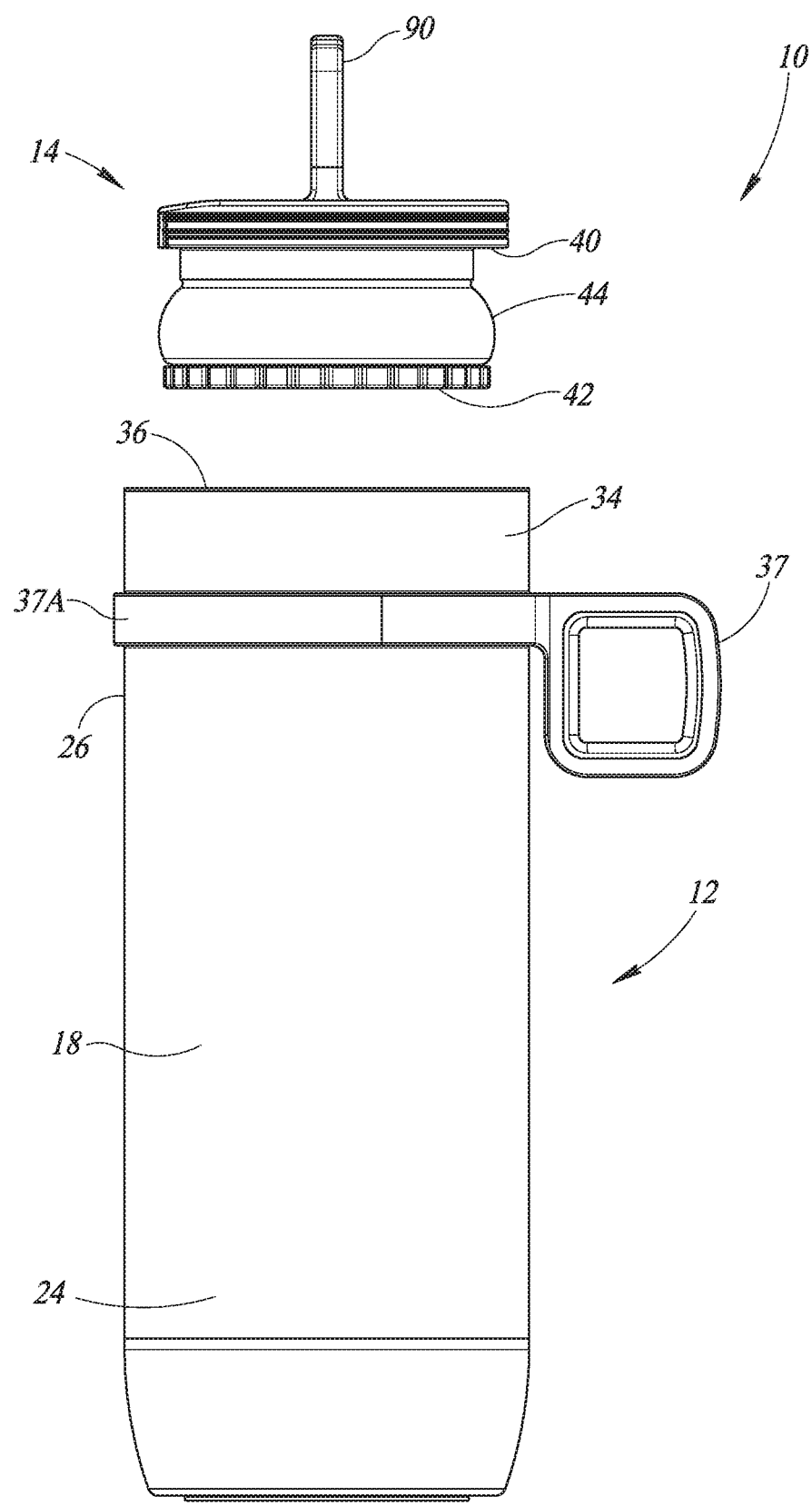
FIG. 5 is a left side elevational view of the drink container of FIG. 4.
Figure 6:
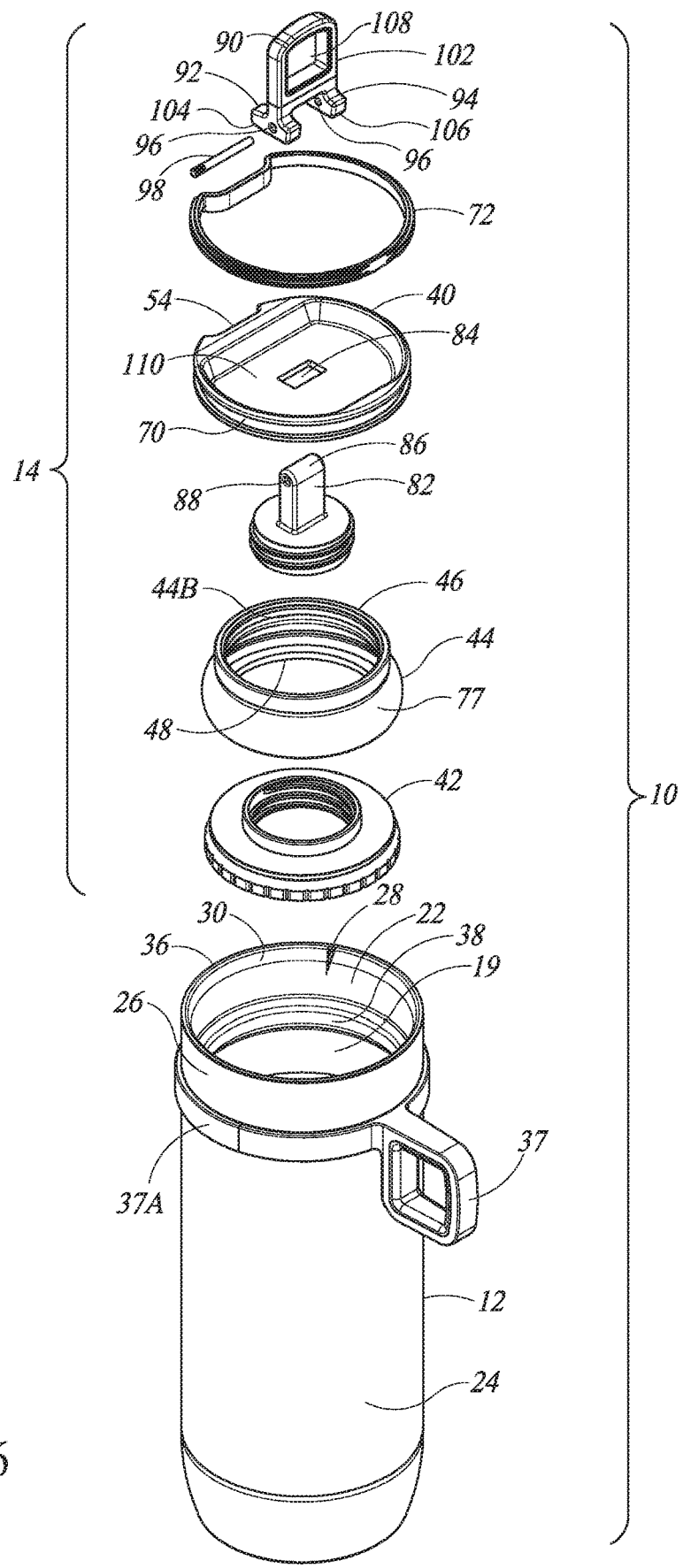
FIG. 6 is a top perspective exploded view of the drink container of FIG. 1.
Figure 7:
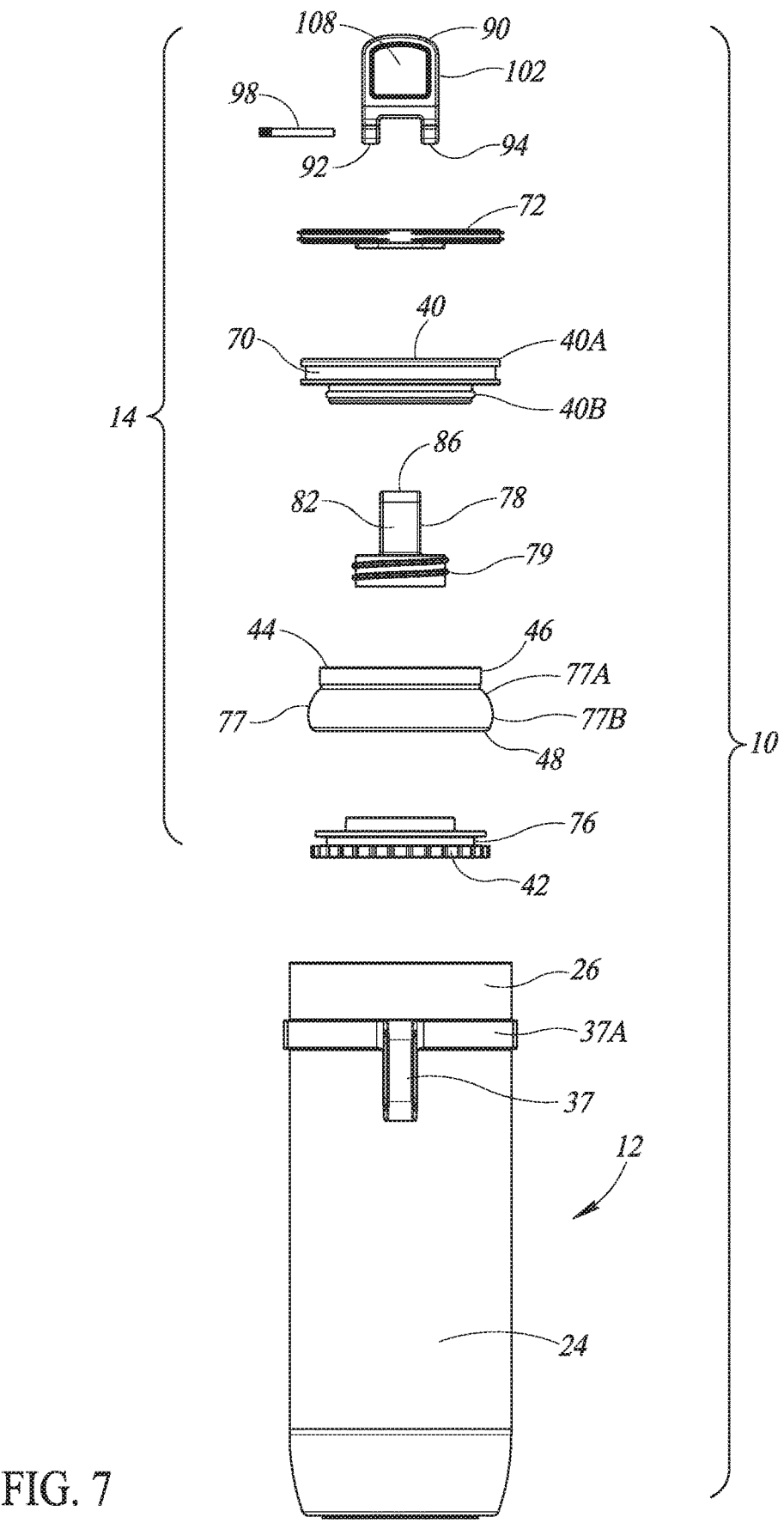
FIG. 7 is a rear elevational exploded view of the drink container of FIG. 1.
Figure 8:
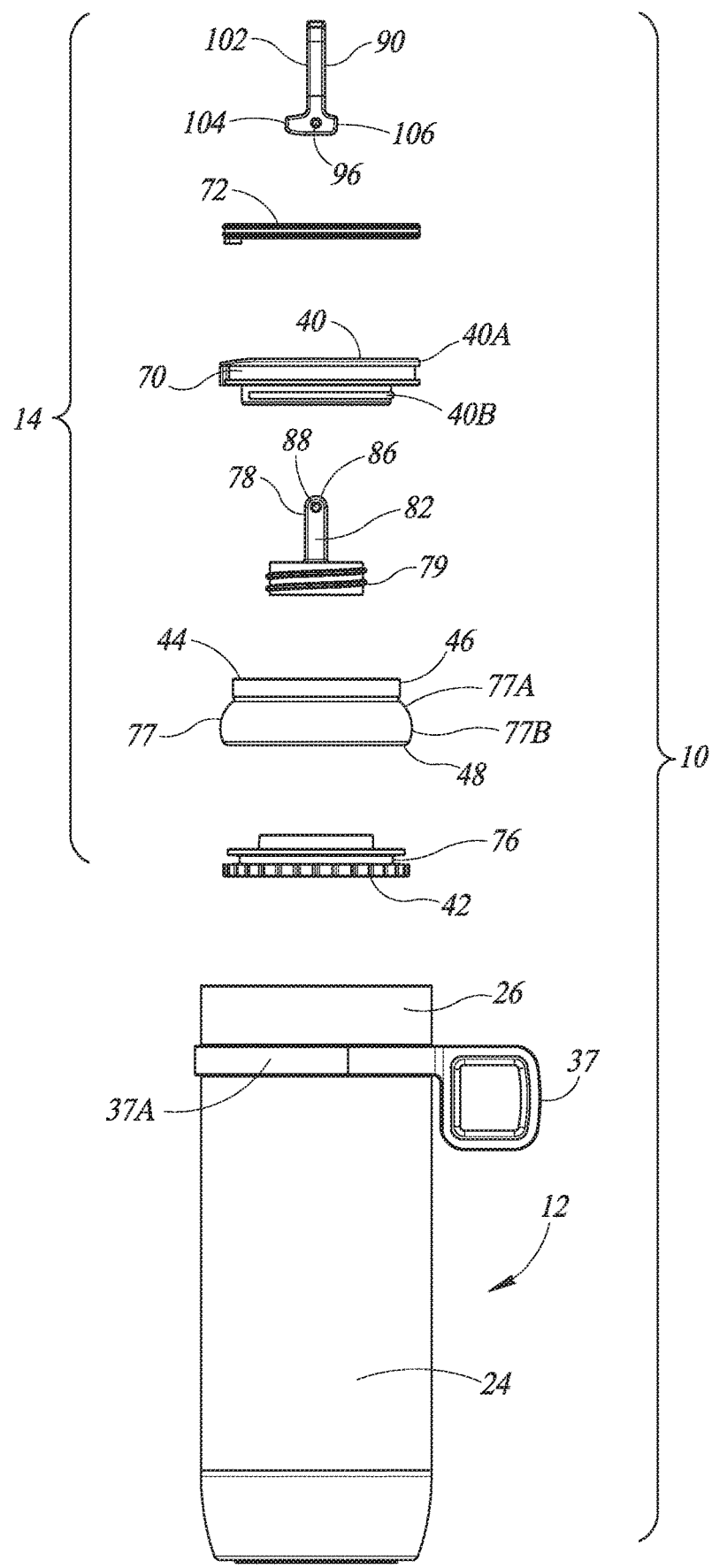
FIG. 8 is a left side elevational exploded view of the drinking container of FIG. 1.
Figure 9:
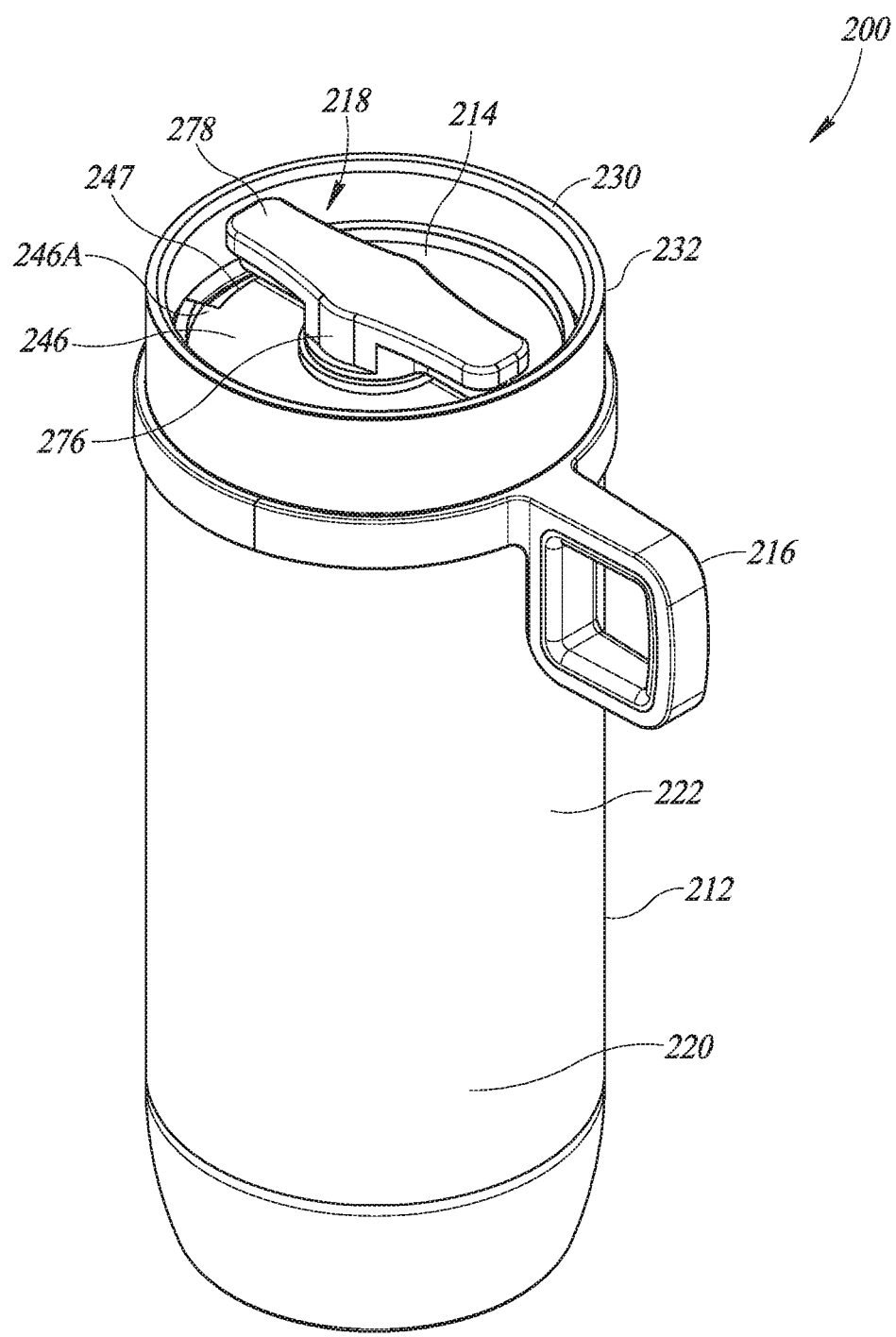
FIG. 9 is a top perspective view of a drink container with a second embodiment of the plug lid in a closed operational position.
Figure 10:
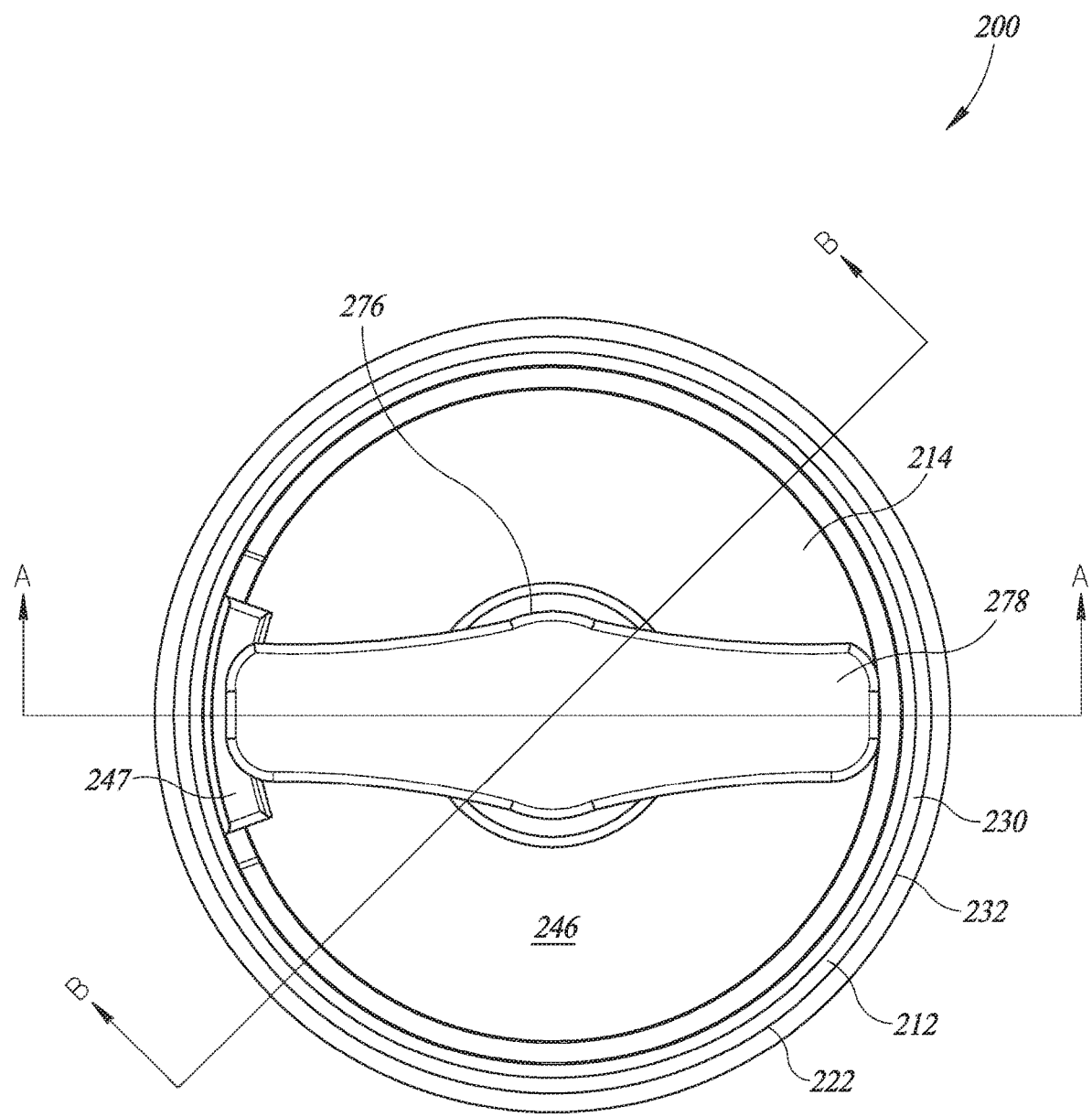
FIG. 10 is a top plan view of the drink container of FIG. 9 with the plug lid in the closed operational position.

When the handle portion 102 is in the third operational position, as best illustrated in FIGS. 3B and 3C, with the handle portion 102 extending straight upward, the first and second cams 104 and 106 extend laterally outward in opposite directions and transverse to the longitudinal axis 29 and are oriented generally parallel to an upper surface 110 of the upper seal carrier 40. In this position, the lower seal carrier 42 is at a maximum distance positioned below the upper seal carrier 40 such that the flexible tubular seal 44 is axially stretched out with the midportion 77 having a width which permits it to be easily moved past the body ridge 38 of the upper inner body portion 22 of the body 12, both when removing the lid 14 from the fluid passageway 28 and when inserting the lid 14 into the fluid passageway. In this position, the lid 14 is opened but not retained within the fluid passageway 28 so as to be removable by the user for filling the lower inner body portion 20 with a liquid or for washing the lid and/or the body 12.

Figure 1B:
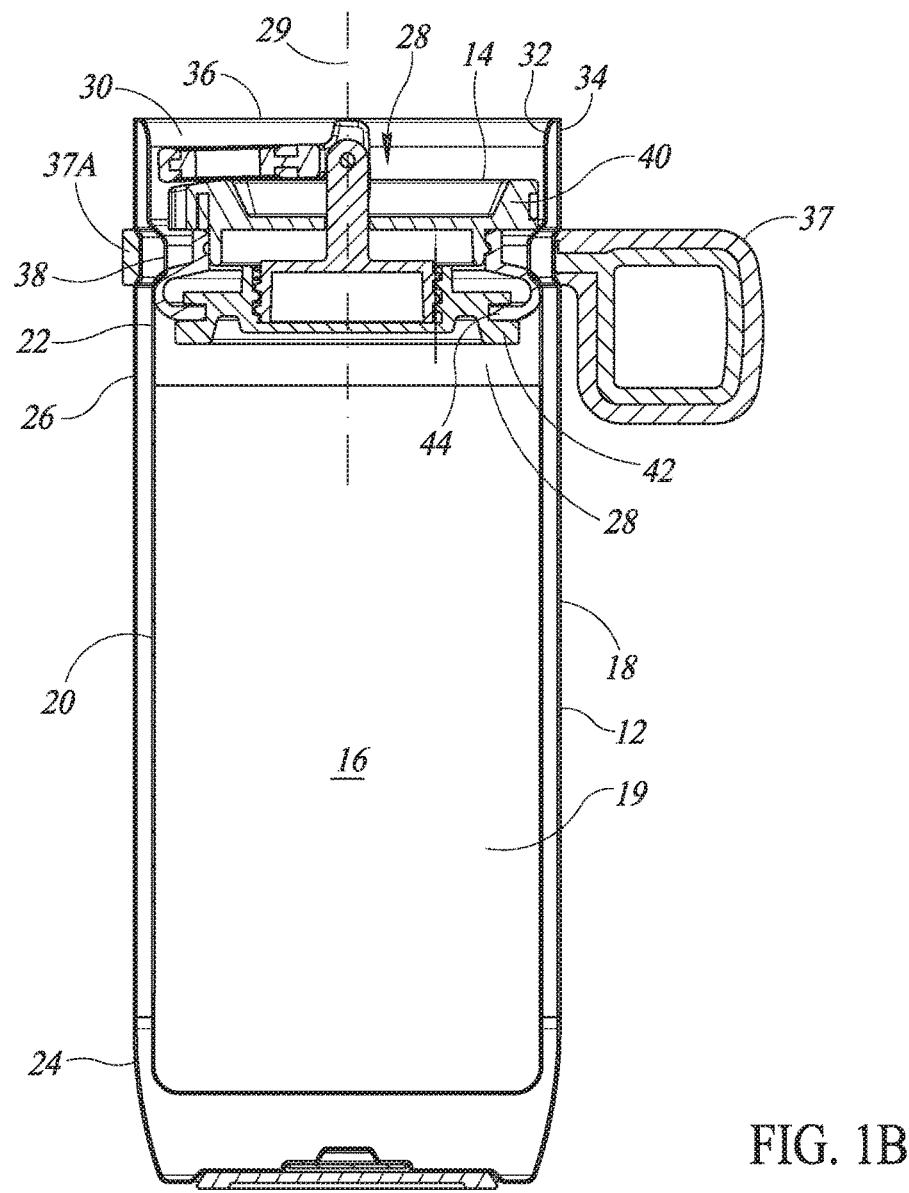
FIG. 1B is a cross-sectional view of the drink container of FIG. 1 taken substantially along the line 1B-1B of FIG. 1A.
Figure 1C:
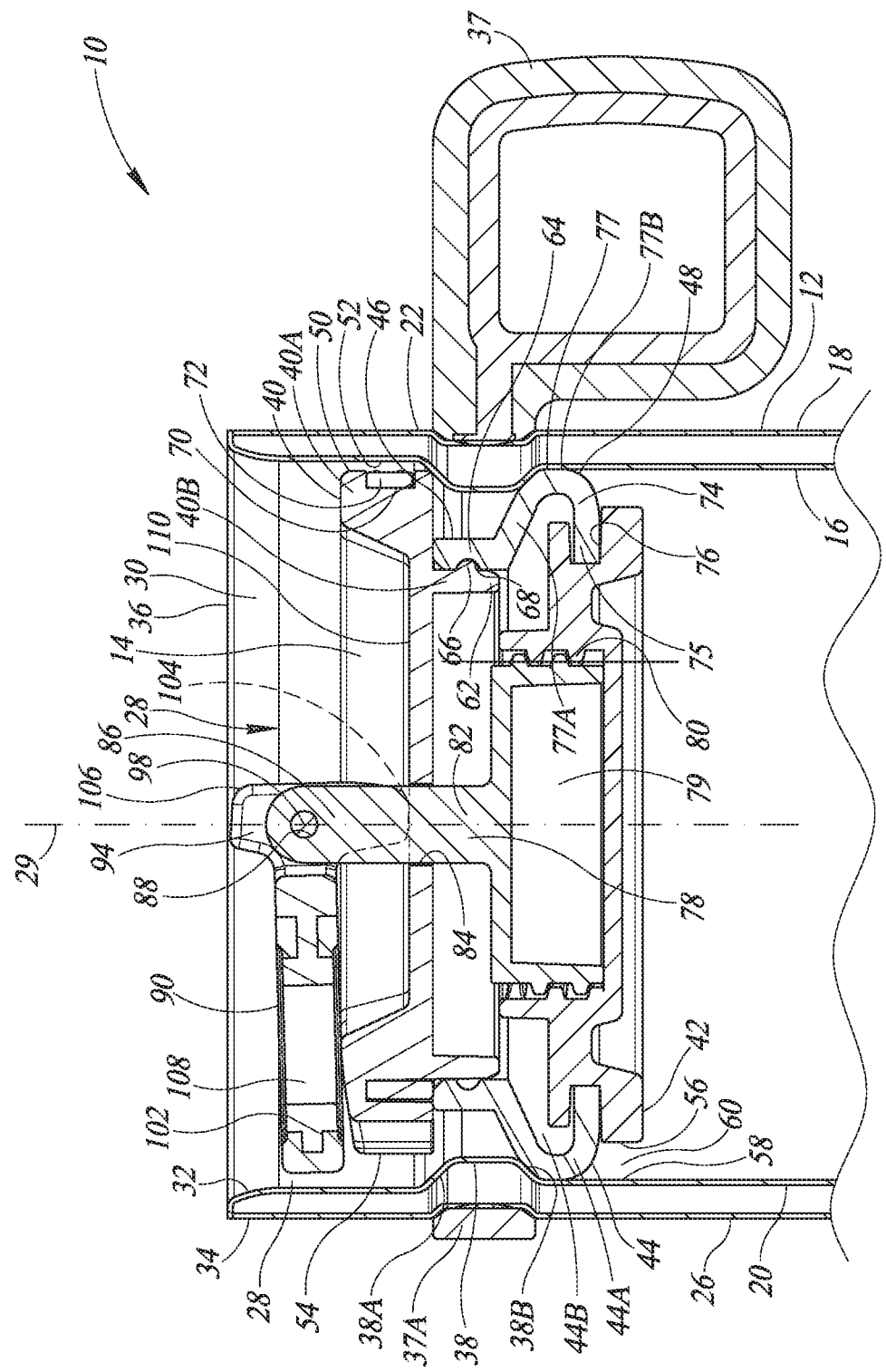
FIG. 1C is a partial enlargement of FIG. 1B.

When the handle portion 102 is rotated from the third operational position to the first operational position, with the handle portion 102 rotated to extend to the left (as viewed in FIG. 1B), as best illustrated in FIG. 1B the longer first cams 104 have been rotated counter-clockwise to engage the upper surface 110 of the upper seal carrier 40 (which rests atop the body ridge 38) and apply an upward axial force on the lifter member 82 which transmits that upward lifting force to the lower seal carrier 42 and moves the lower seal carrier closer to the upper seal carrier 40. During this movement the shorter second cams 106 are out of contact with the upper surface 110. This results in flexing of the tubular seal 44 radially outward (transverse to the longitudinal body axis 29), thus increasing the lateral width of the outward bulge of the midportion 77 of the tubular seal sufficiently and moving the midportion into fluid-tight sealingly engagement with a lower portion of the body ridge 38 of the upper inner body portion 22 of the body 12, creating a fluid-tight compression seal therewith. In this position, the lower seal carrier 42 is at a minimum distance positioned below the upper seal carrier 40 such that the flexible tubular seal 44 is compressed. As a result, the lid 14 is closed and securely retained within the fluid passageway 28 so no liquid can pass fully through the fluid passageway 28 and be drunk from the drink container 10, and the lid 14 cannot be removed from the body 12. If the handle portion 102 was moved to the first operational position with the lid 14 removed from the fluid passageway 28, the expanded midportion 77 of the tubular seal 44 would prevent it from being reinserted into the fluid passageway.

Figure 2:
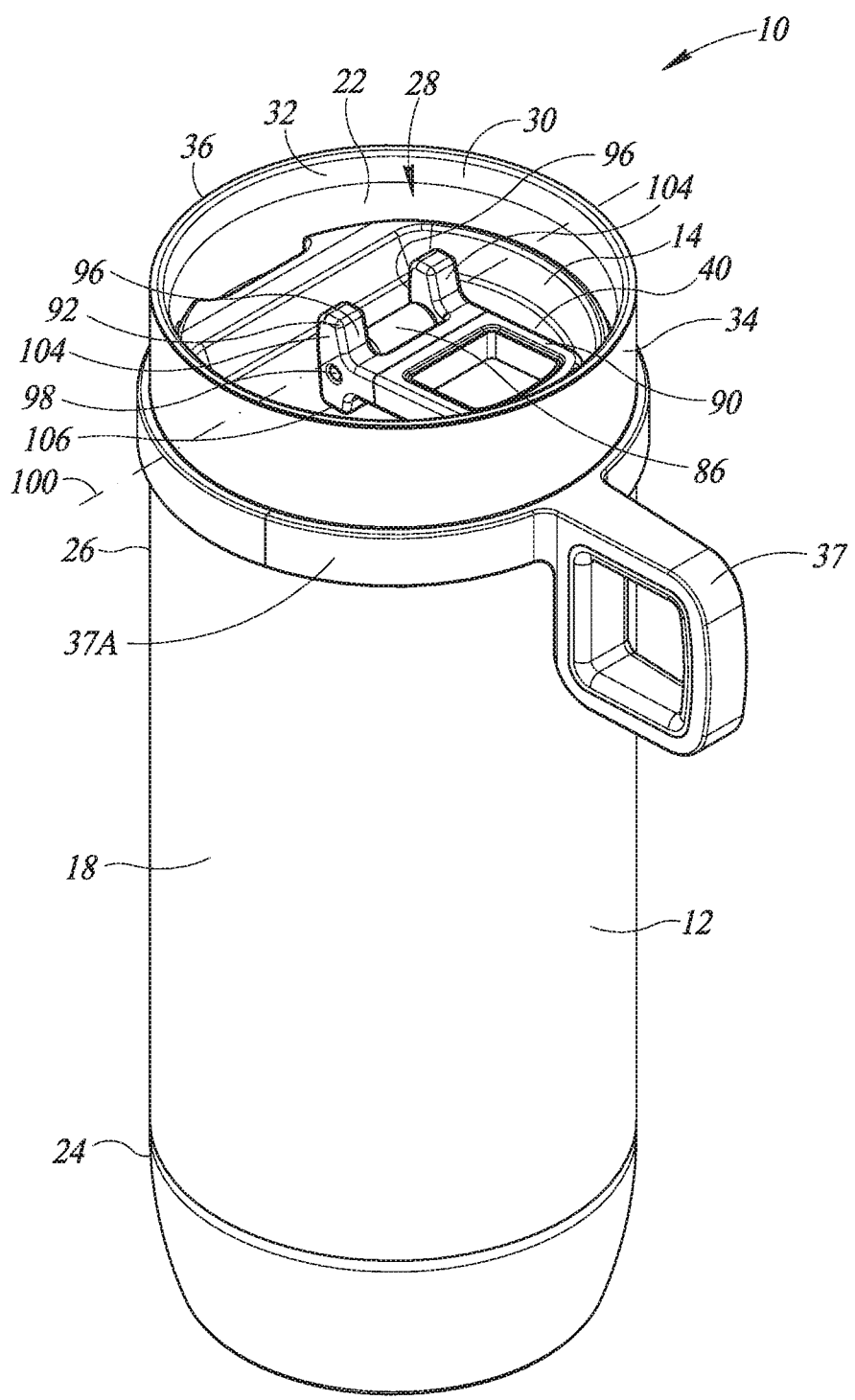
FIG. 2 is a top perspective view of the drink container of FIG. 1 with the plug lid in a second operational position.
Figure 2A:
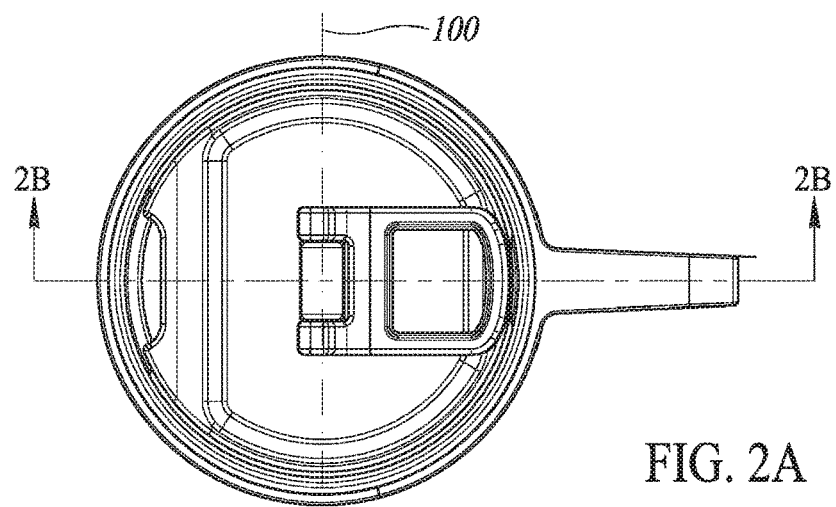
FIG. 2A is a top plan view of the drink container of FIG. 2.
Figure 2B:
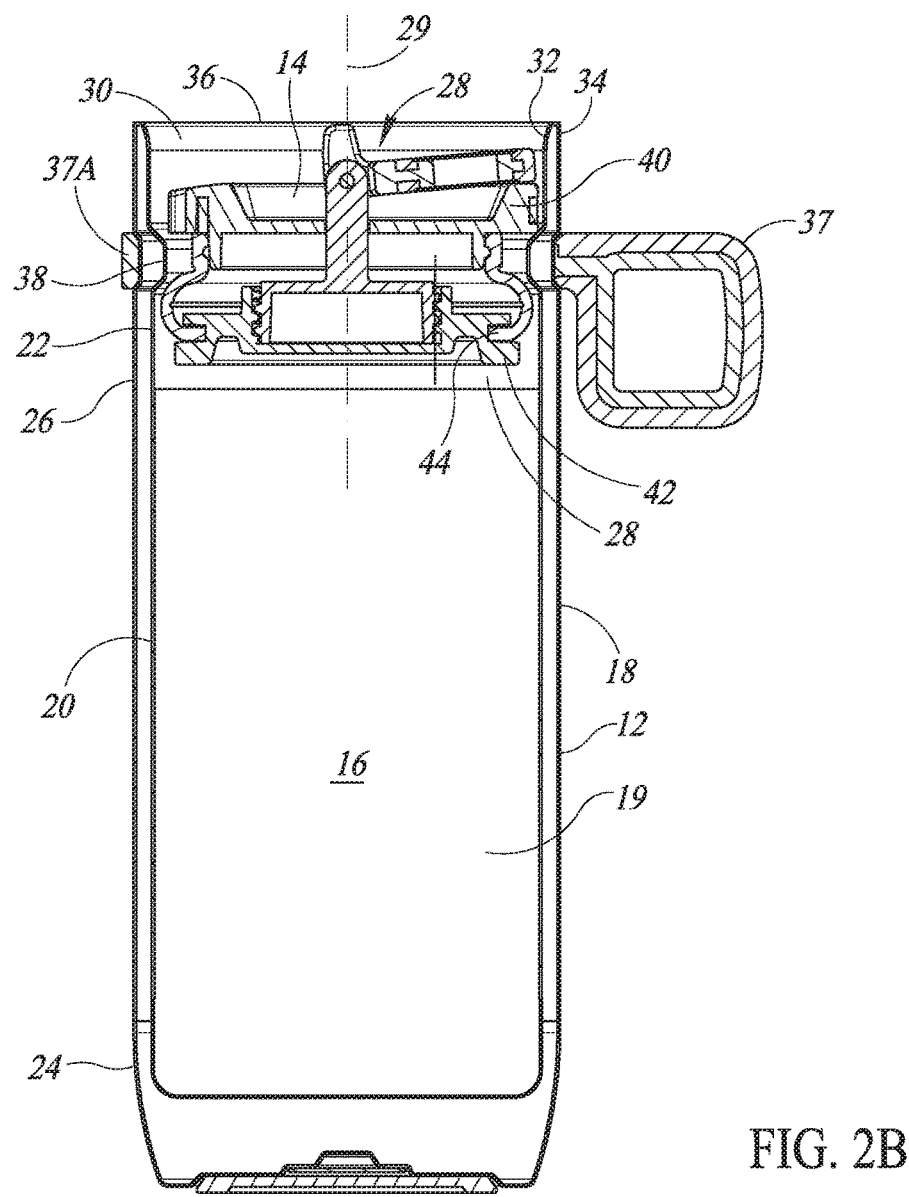
FIG. 2B is a cross-sectional view of the drink container of FIG. 2 taken substantially along the line 2B-2B of FIG. 2A.
Figure 2C:
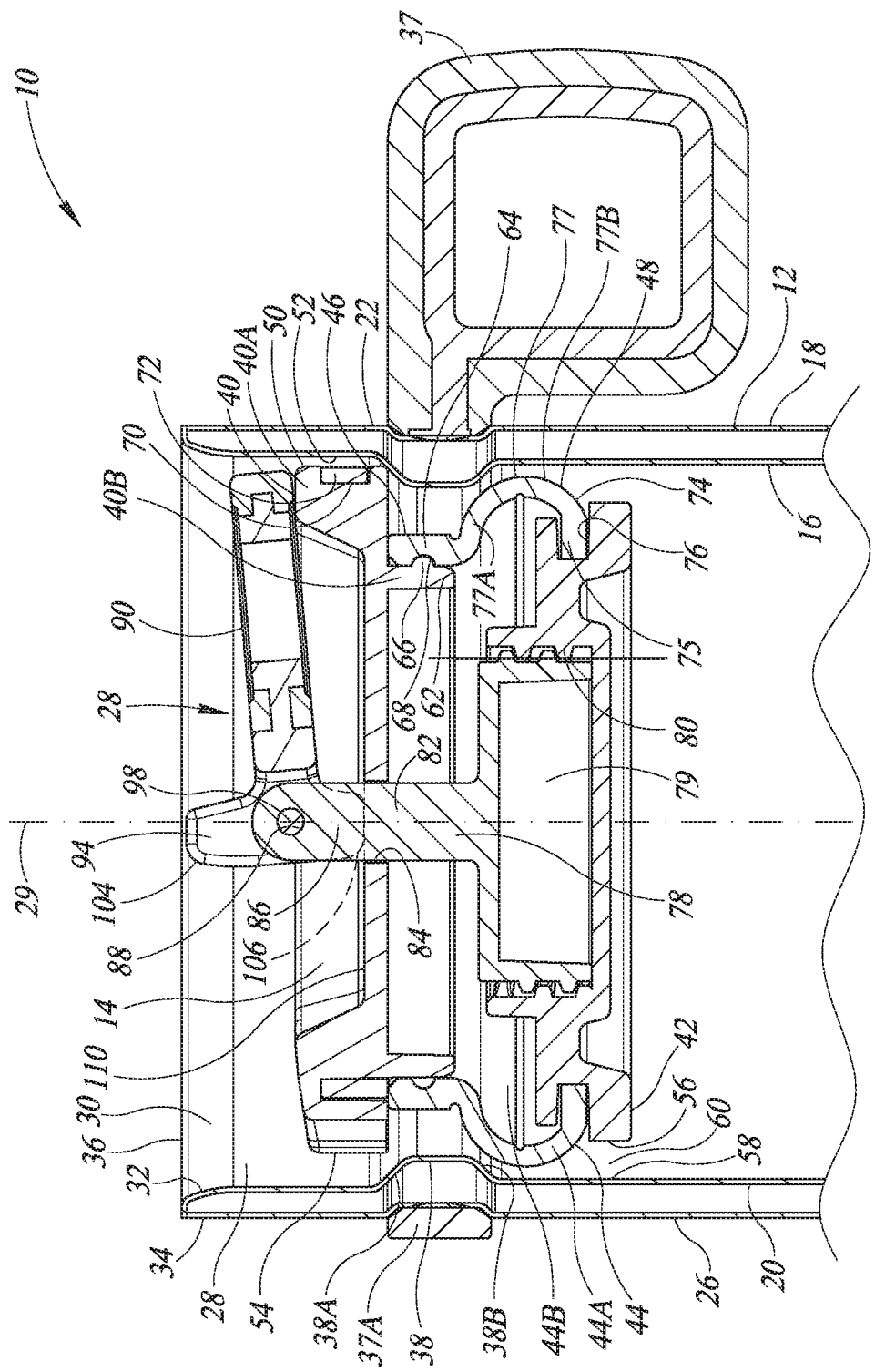
FIG. 2C is a partial enlargement of FIG. 2B.

When the handle portion 102 is rotated from third operational position to the second operational position, with the handle portion 102 rotated to extend to the right (as viewed in FIG. 2B), as best illustrated in FIG. 2B the shorter second cams 106 have been rotated clockwise to engage the upper surface 110 of the upper seal carrier 40 (which rests atop the body ridge 38) and apply an upward axial force on the lifter member 82 which transmits that upward lifting force to the lower seal carrier 42 and moves the lower seal carrier closer to the upper seal carrier 40. During this movement the longer first cams 104 are out of contact with the upper surface 110. This results in flexing of the tubular seal 44 radially outward (transverse to the longitudinal body axis 29), thus increasing the lateral width of the outward bulge of the midportion 77 of the tubular seal, but not sufficiently that it sealingly engages the lower portion of the body ridge 38 of the upper inner body portion 22 of the body 12 and thus does not close off the flow of liquid through the fluid passageway 28. In this position, the lower seal carrier 42 is at a middle distance positioned below the upper seal carrier 40, which is greater than the minimum distance resulting when the handle portion 102 is in the first operational position, but less than the maximum distance resulting when the handle portion is in the third operational position. As a result, the flexible tubular seal 44 is only partially compressed compared to when the handle portion 102 is in the first operational position. The partial compression of the tubular seal 44 causes the midportion 77 to move outward sufficiently that it will engage the lower portion of the body ridge 38 to inhibit removal of the lid 14 from within the fluid passageway 28 and prevent unintended removal should the lid experience an axial force moving tending to move it toward the upper end opening 30 of the upper inner body portion 22, while still permitting drinking liquid from the drink contain 10. For example, when the handle portion 102 is in the second operational position, if during drinking or carrying the drink container 10 it is sufficiently tilted or upwardly jarred such that an axial force is exerted on the lid 14 that would otherwise cause the lid to move out of the fluid passageway 28, before doing so the expanded midportion 77 of the tubular seal 44 will move into engagement with the lower portion of the body ridge 38 and thereby prevent the unintended lid removal. Depending on the extent of compression of the tubular seal 44 selected for the design, the user might still be able to apply enough intentional upward force on the handle portion 102 to flex the midportion 77 inward sufficiently to result in removal of the lid 14 from the fluid passageway 28.

The three position lid 14 allows the user to drink from the drinking container 10 while at the same time keeping the lid securely and safely retained within the fluid passageway 28 against unintended lid removal, and to both open the fluid passageway for drinking and close the fluid passageway for transport without having to remove the lid from or reinsert the lid into the fluid passageway. These operations and features are accomplished simply by rotating the handle portion between its three operational positions without removal and reinsertion of the lid 14.

An alternative embodiment of a drinking vessel or drink container 200 in accordance with the present embodiment is shown in FIGS. 9-25. The drink container is shown in a closed state in FIGS. 9-12. The drink container 200 includes a substantially cylindrical body 212 and a lid 214. As discussed above for the body 12, the body 212 may have a double wall construction for improved thermal insulation, using an inner body positioned and secured within an outer body. In this illustrated alternative embodiment, the body 212 has a single wall construction, which in a double wall construction drink container would serve as the inner body.

Figure 11:
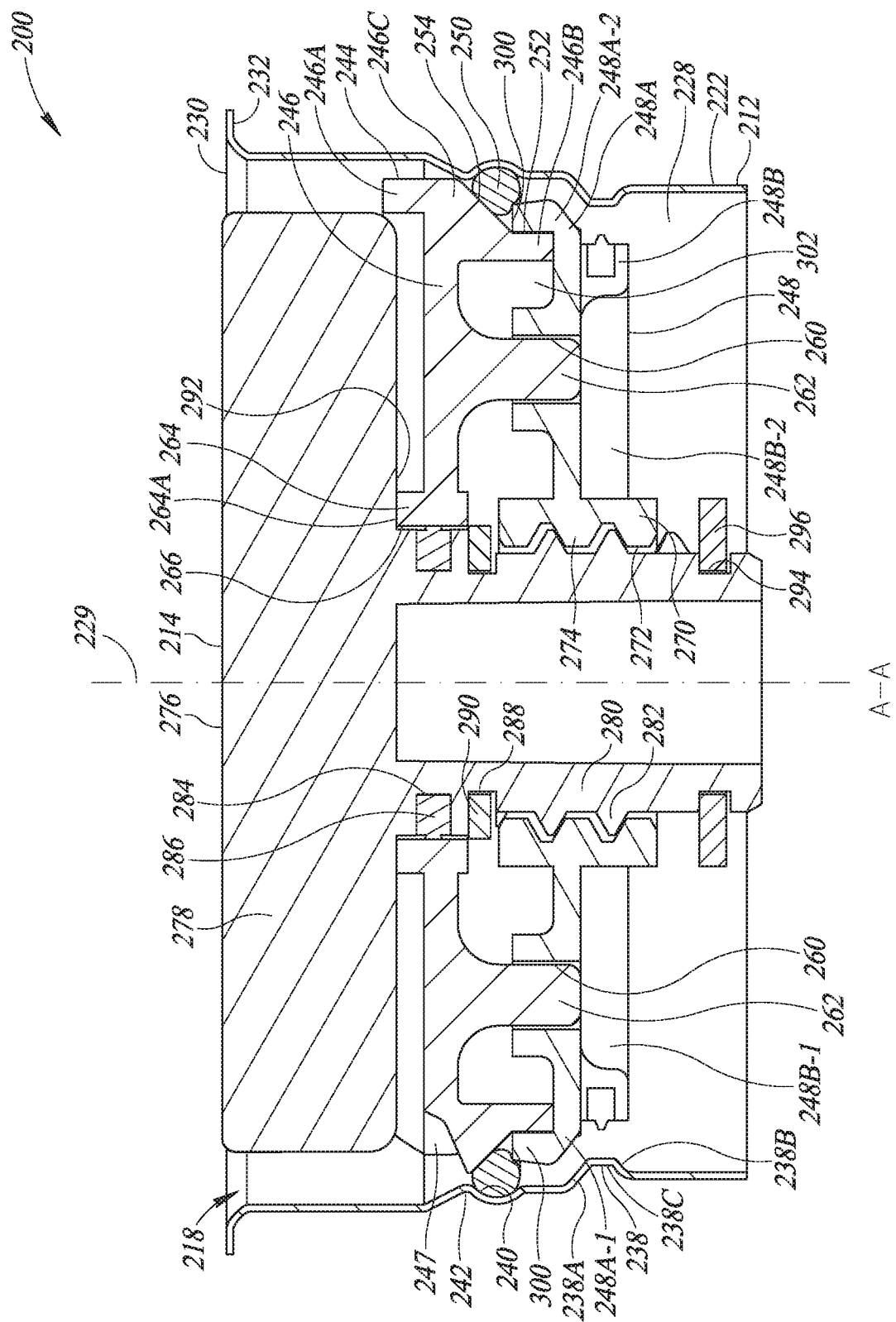
FIG. 11 is a cross-sectional view of the drink container of FIG. 9 with the plug lid in the closed operational position taken substantially along the line A-A of FIG. 10.
Figure 12:
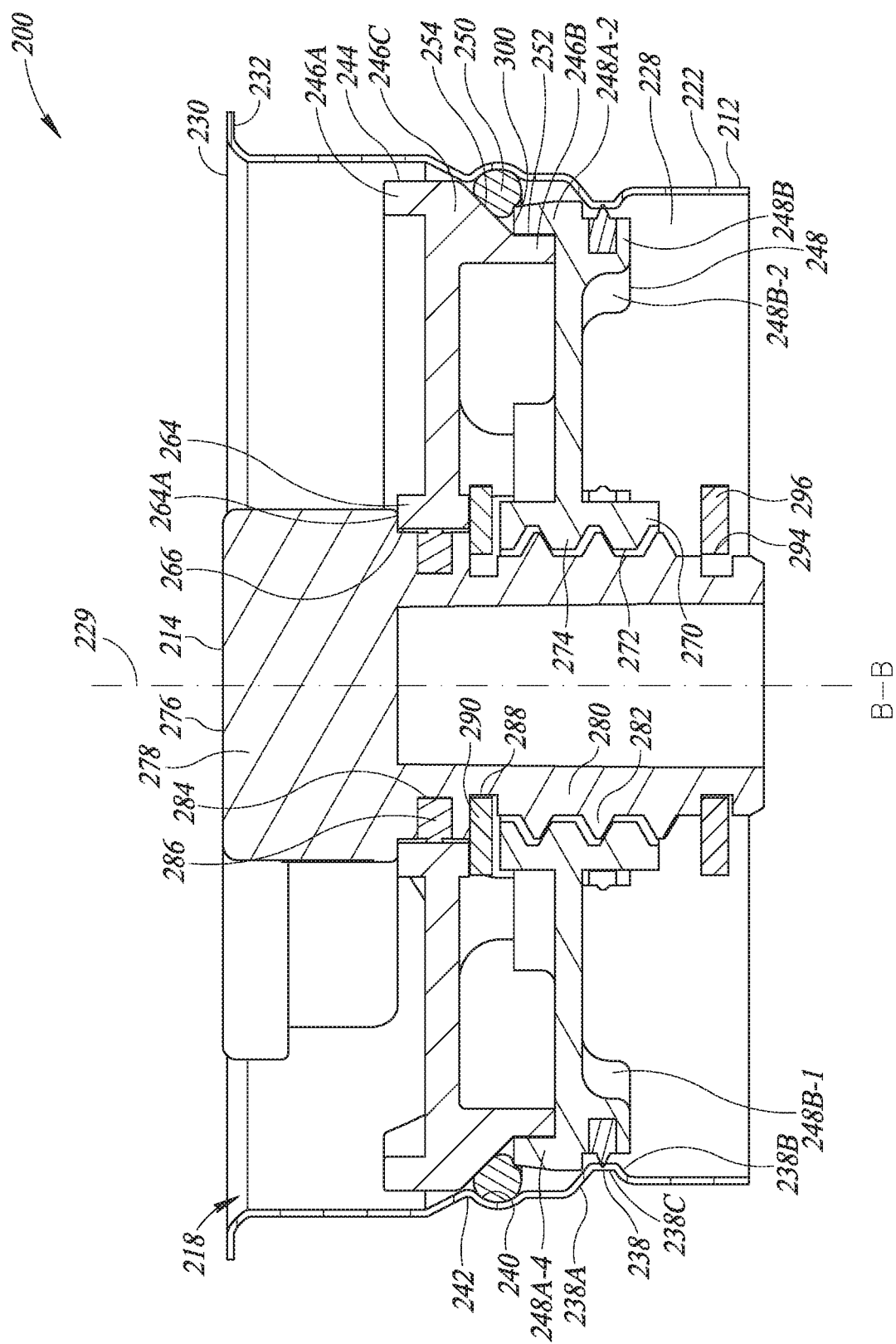
FIG. 12 is a cross-sectional view of the drink container of FIG. 9 with the plug lid in the closed operational position taken substantially along the line B-B of FIG. 10.
Figure 13:
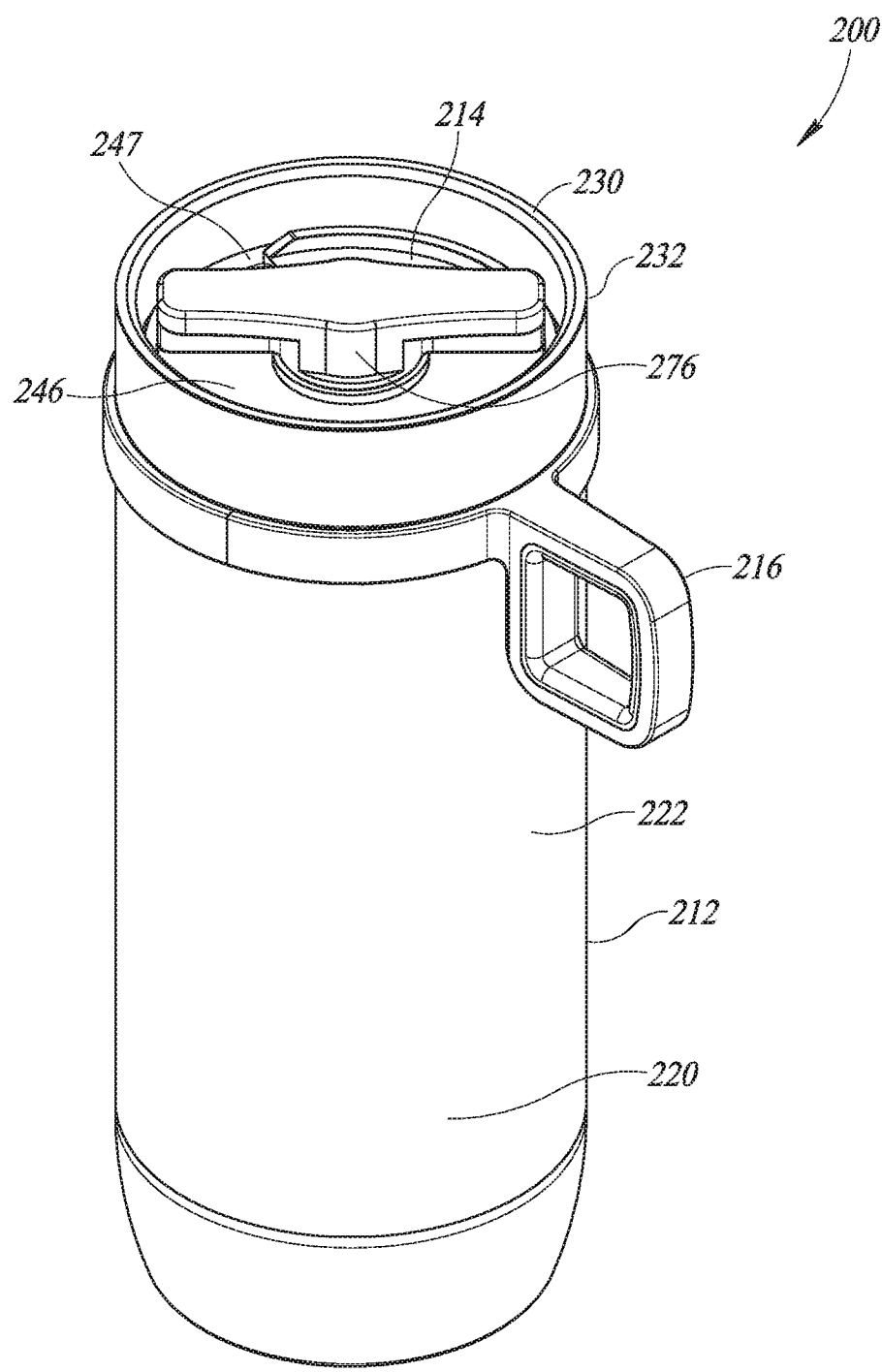
FIG. 13 is a top perspective view of the drink container of FIG. 9 with the plug lid in an intermediate operational position.
Figure 14:
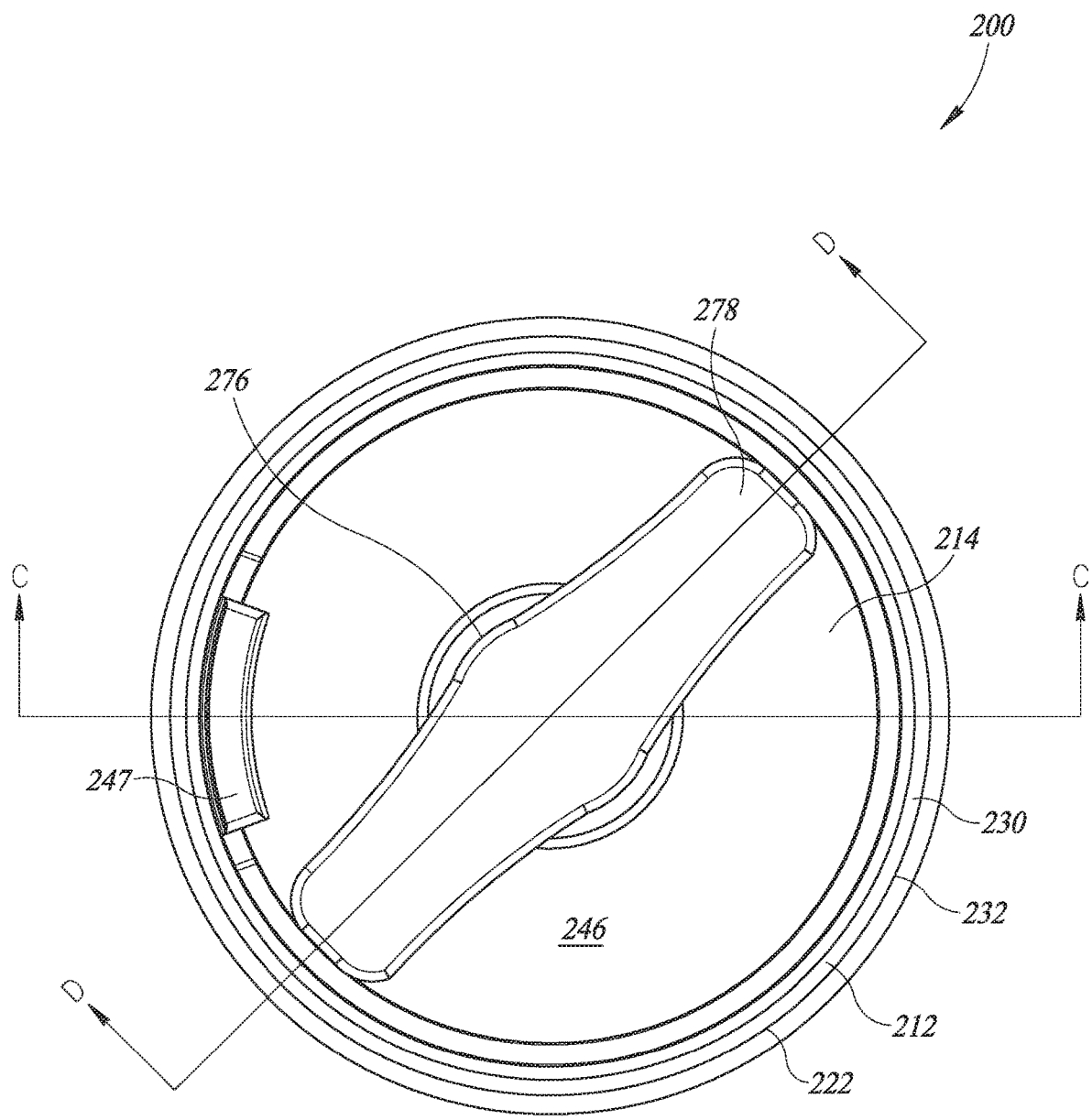
FIG. 14 is a top plan view of the drink container of FIG. 9 with the plug lid in the intermediate operational position.
Figure 15:
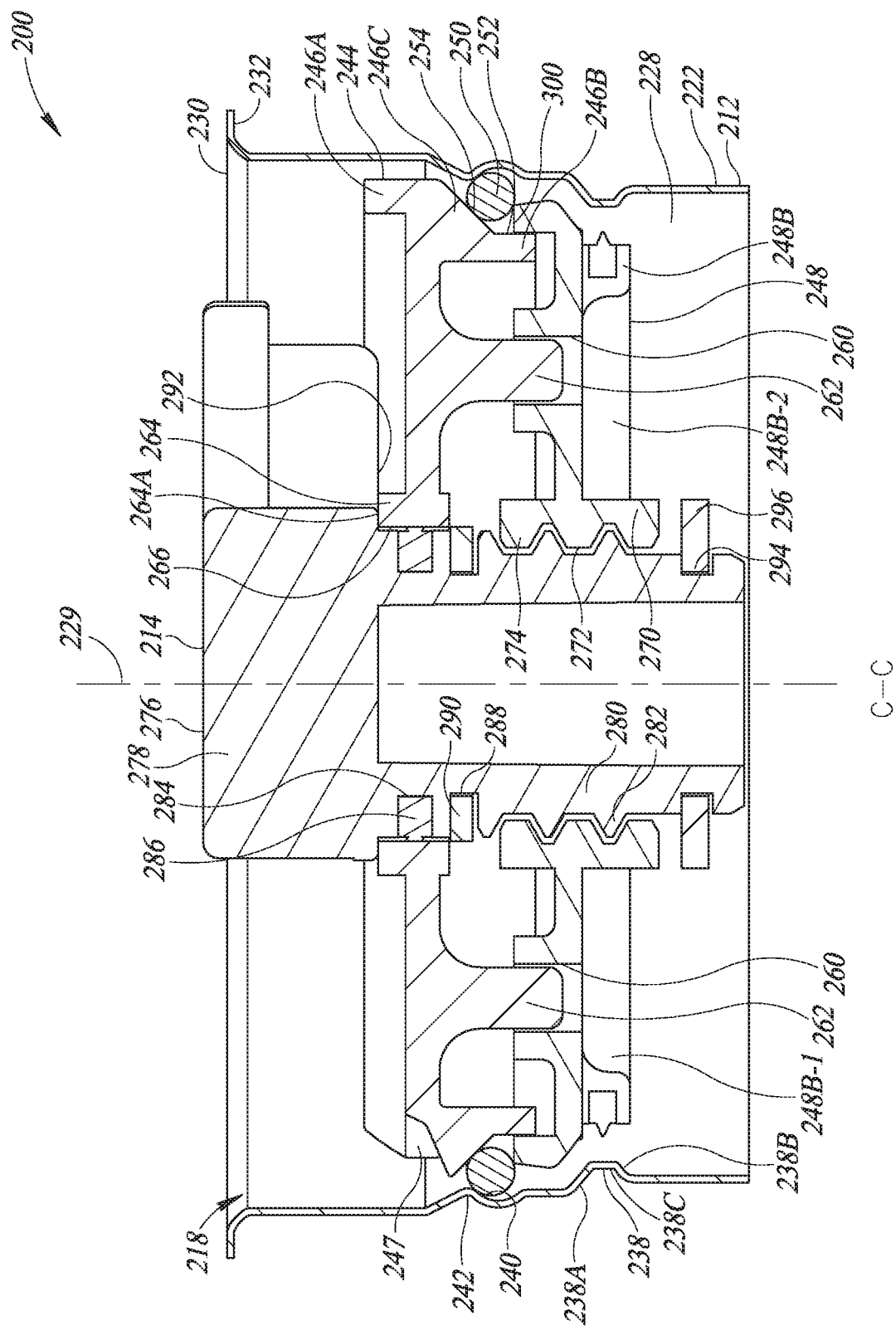
FIG. 15 is a cross-sectional view of the drink container of FIG. 9 with the plug lid in the intermediate operational position taken substantially along the line C-C of FIG. 10.

The body 212 has a lower body portion 220 and an upper body portion 222 defining a hollow interior chamber 218. A drinkable liquid (not shown) may be stored in the lower body portion 220 when the drink container 200 is in an upright position. As illustrated in FIGS. 11 and 12, the upper body portion 222 has an interior fluid passageway 228 with a longitudinal axis 229 and an upper end opening 230 at the upper end of the upper body portion 222 through which the liquid stored in lower body portion 220 may flow for drinking or pouring when the drink container 200 is sufficiently tilted. An upper end portion 232 of the upper body portion 222 defines a drinking lip at the upper end of the body 212 on which the lips of a user may be positioned for drinking the liquid stored in lower body portion 220 when the drink container 200 is sufficiently tilted. The body 212 may include a handle 216 to facilitate the user holding the drink container 200.

The upper body portion 222 has an interior, circumferentially extending inward protrusion or body ridge 238 projecting inward within the fluid passageway 228. The body ridge 238 extends continuously about the circumference of the upper body portion 222. The body ridge 238 has a circumferentially extending upper wall portion 238A which slopes downward in the inward direction, a circumferentially extending lower wall portion 238B which slopes upward in the inward direction, and a circumferentially extending vertical middle wall portion 238C positioned between the upper and lower wall portions. As will be described, the body ridge 238 serves as a stop to support the lid 214 when within the fluid passageway 228 and limit downward movement of the lid within the fluid passageway, and also as an engagement surface the lid grips when within the fluid passageway to inhibit its unintentional upward movement within the fluid passageway. In alternative embodiments not illustrated, the body ridge 238 may not be continuous.

The upper body portion 222 further has an interior, inwardly opening, circumferentially extending upper body recess 240 within the fluid passageway 228, at a location above the body ridge 238 and below the upper end opening 230, which extends continuously about the internal circumference of the upper body portion and serves as a seal seat, as will be described in greater detail below. An upper edge wall 242 of the recess 240 protrudes inwardly into the fluid passageway 228.

The lid 214 is a plug-type closure which is insertable by the user into the fluid passageway 228 through the upper end opening 230 for use of the drink container 200 for storing, transporting and drinking a liquid, and is removable therefrom when desired by the user for washing the lid and/or body 212 of the drink container. The lid 214 may be operated to move between two states, i.e., a closed and securely retained first state as shown in FIGS. 9-12, and an opened and retained, but easily removable second state as shown in FIGS. 17-20. FIGS. 13-16 show the lid 214 in an intermediate position through which the lid moves when transitioning between the first (closed) state and the second (opened) state, as will be described in more detail below.

In the first (closed) state the lid 214 is closed and securely retained within the fluid passageway 228 so no liquid can be drunk or spilled from the drink container 200 and the lid cannot be removed from the body 212 (or inserted into the fluid passageway). In the second (opened) state the lid 214 is opened for drinking and retained within the fluid passageway 228 against unintended removal, but with sufficient upward force applied by the user, the lid is removable for filling the lower body portion 220 with a liquid or for washing the lid and/or the body 212. The individual component parts of the drink container 200 are separately illustrated in the exploded views of FIGS. 21-23 and the component views of FIGS. 24 and 25.

The lid 214 includes a seal assembly 244 having an upper member 246, a lower member 248 and a stretchable and a resilient ring seal 250. In the illustrated embodiment the ring seal 250 is an O-ring but other shapes of ring-type seals may be used. The upper member 246 has a circumferentially extending, perimeter upper member portion 246A, a smaller diameter circumferentially extending, perimeter lower member portion 246B and a circumferentially extending, perimeter middle member portion 246C positioned between the upper and lower member portions. A drink dispensing aperture 247 formed by an inwardly recessed region of the perimeter upper member portion 246A is provided for liquid to pass for drinking when the drink container 200 is sufficiently tilted and the lid is in its second (opened) state. The perimeter lower member portion 246B has a circumferentially extending vertical, outward facing perimeter wall 252, and the perimeter middle member portion 246C has a circumferentially extending, outward facing perimeter smooth ramp wall 254 which slopes upward in the outward direction with the shape of a conical wall section.

Figure 19:
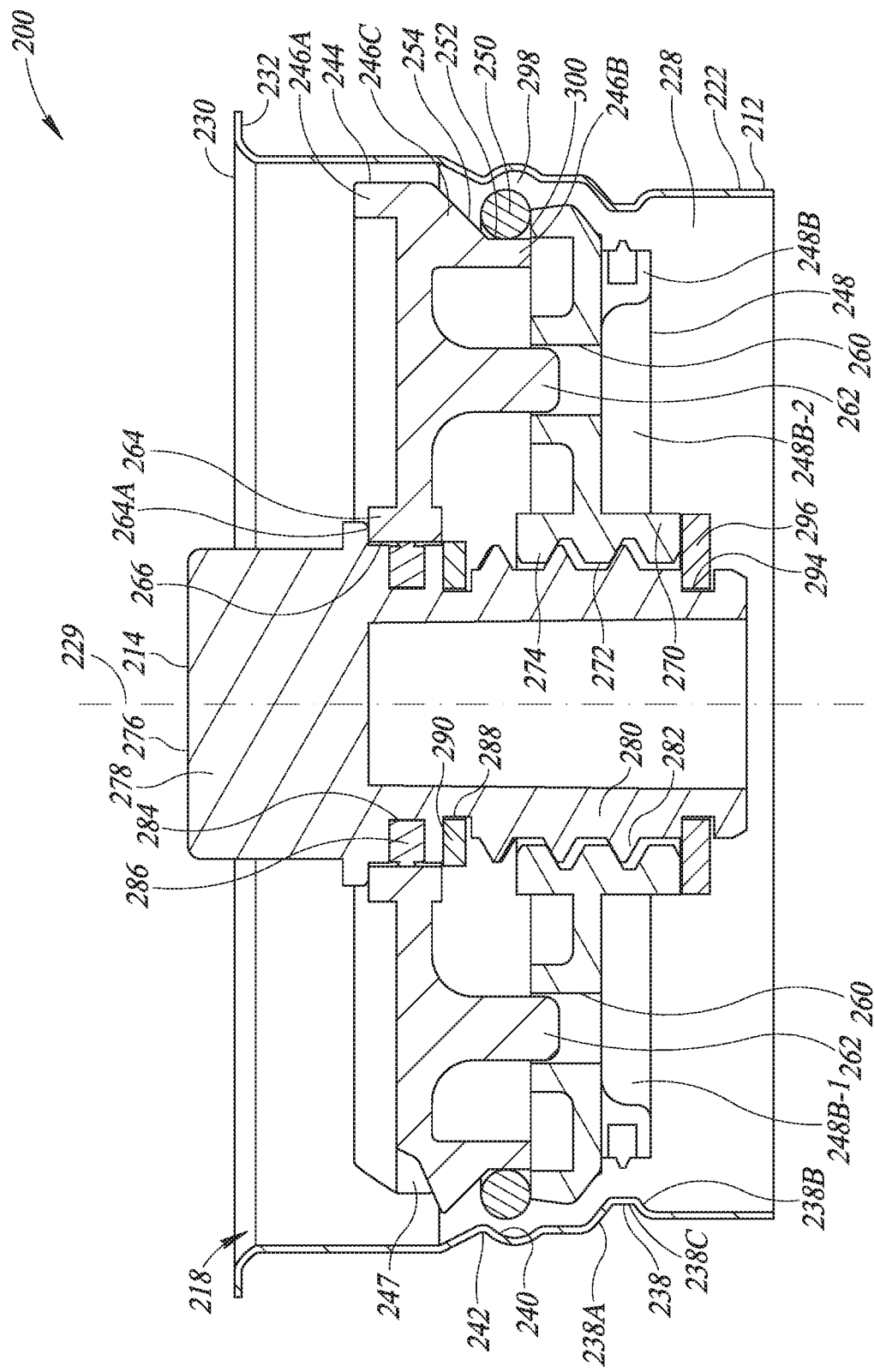
FIG. 19 is a cross-sectional view of the drink container of FIG. 9 with the plug lid in the closed operational position taken substantially along the line E-E of FIG. 10.
Figure 20:
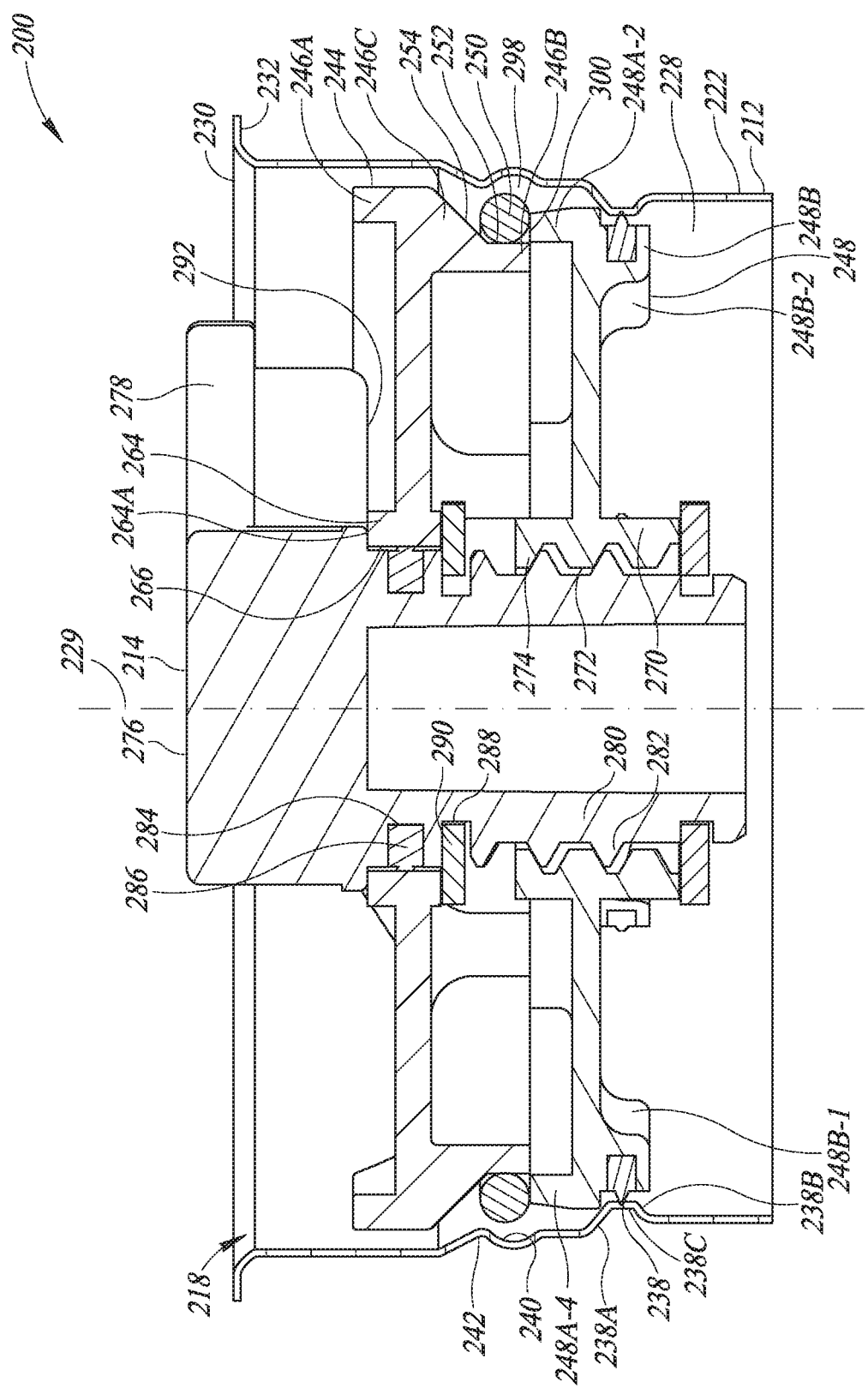
FIG. 20 is a cross-sectional view of the drink container of FIG. 9 with the plug lid in the closed operational position taken substantially along the line F-F of FIG. 10.
Figure 21:
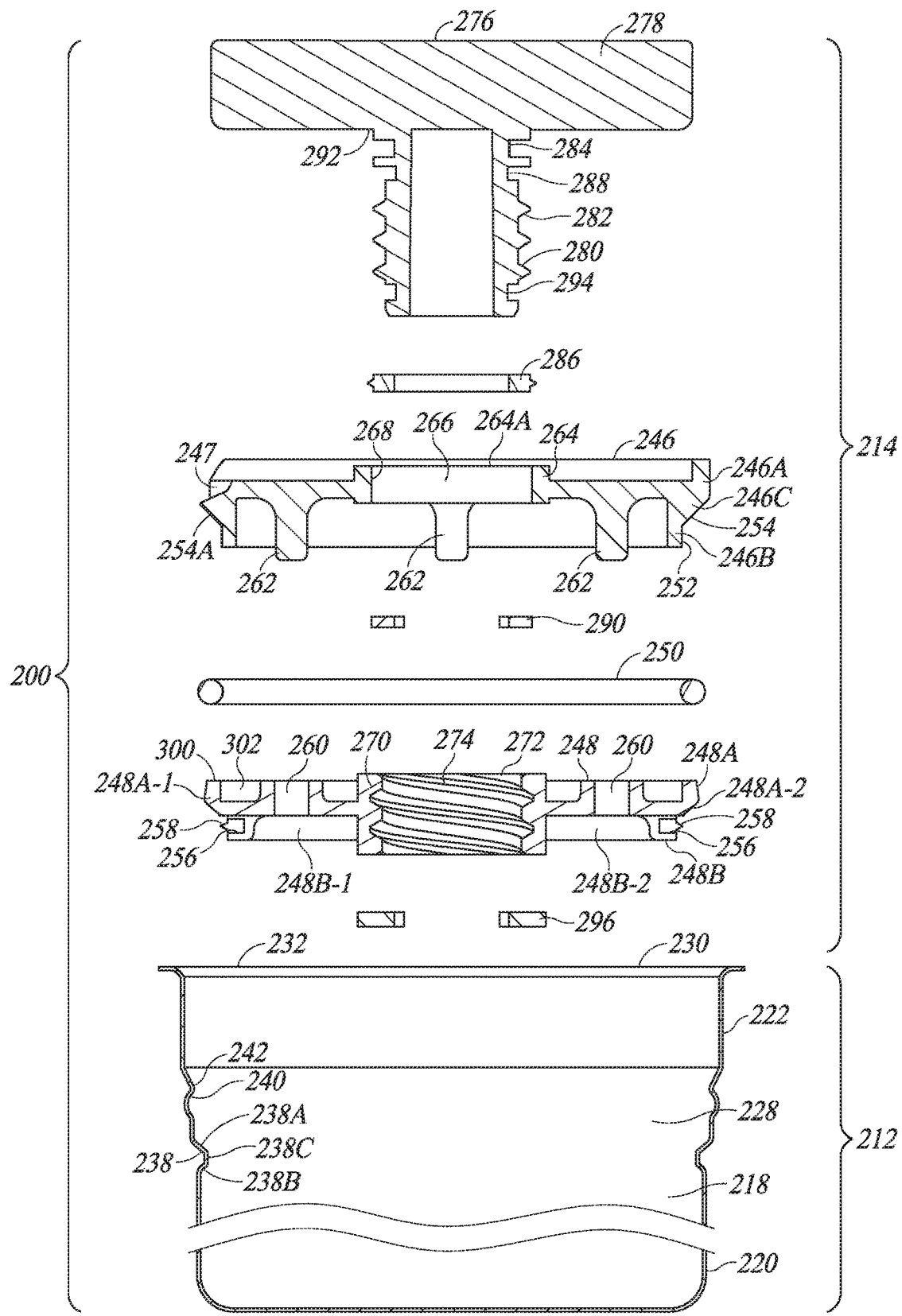
FIG. 21 is a partial cross-sectional, elevational exploded view of the drinking container of FIG. 9 taken substantially along the line A-A of FIG. 10.
Figure 22:
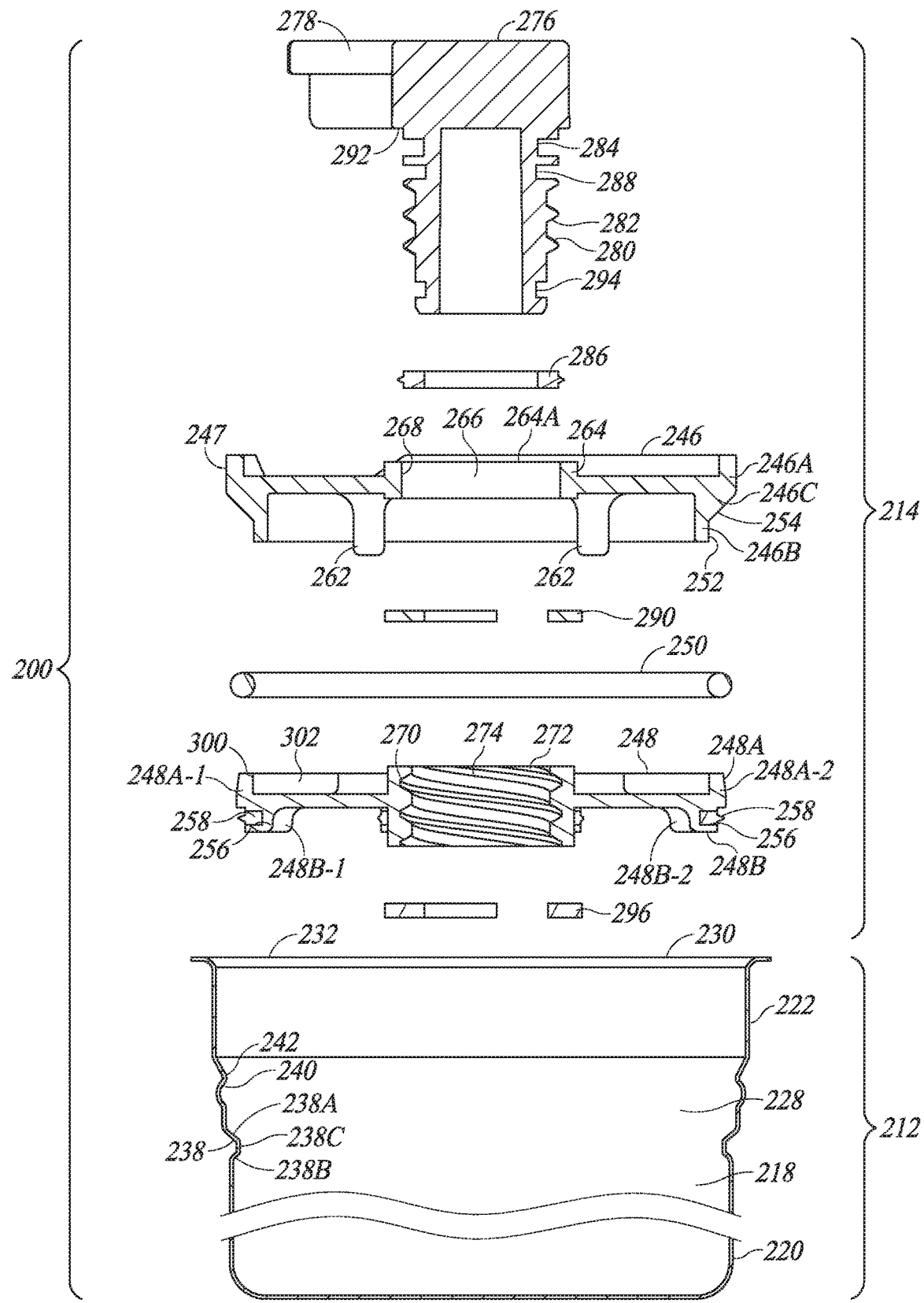
FIG. 22 is a partial cross-sectional, elevational exploded view of the drinking container of FIG. 9 taken substantially along the line B-B of FIG. 10.
Figure 23:
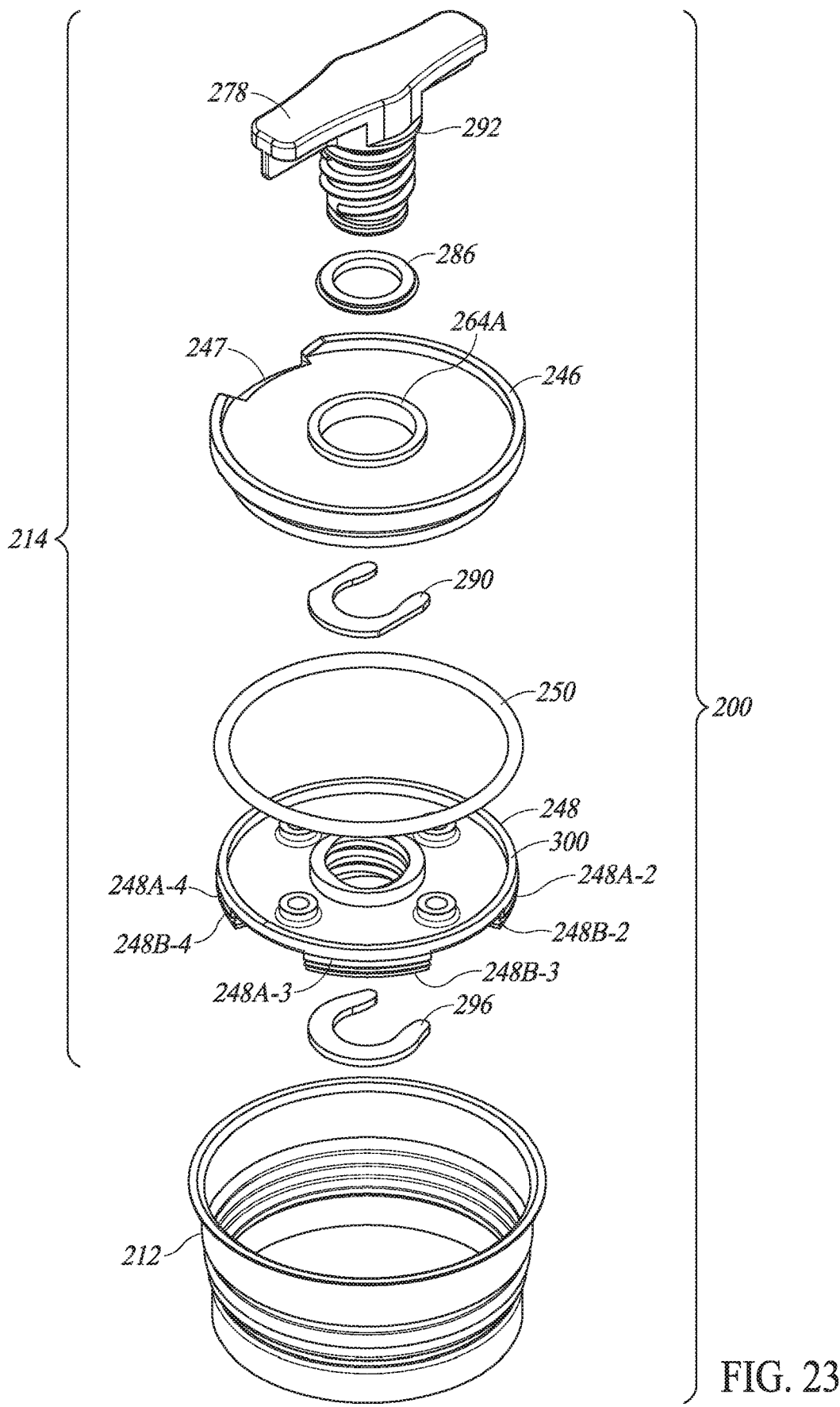
FIG. 23 is a top perspective exploded view of the drink container of FIG. 9.
Figure 24:
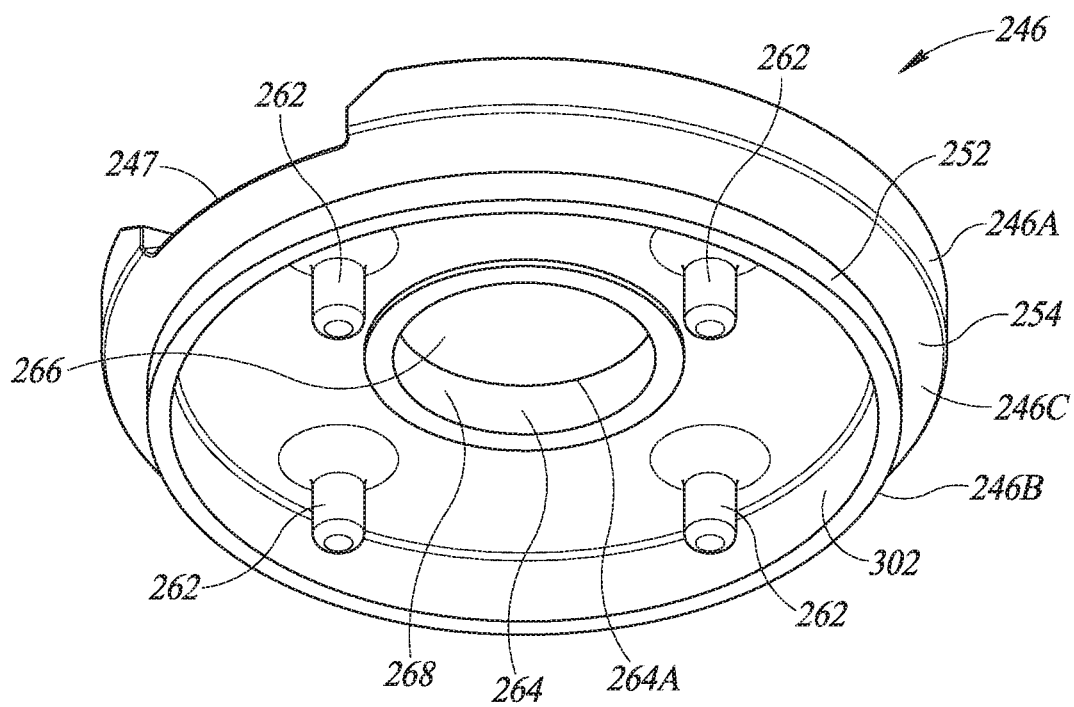
FIG. 24 is a bottom perspective exploded view of an upper member of a seal assembly of the drink container of FIG. 9.
Figure 25:
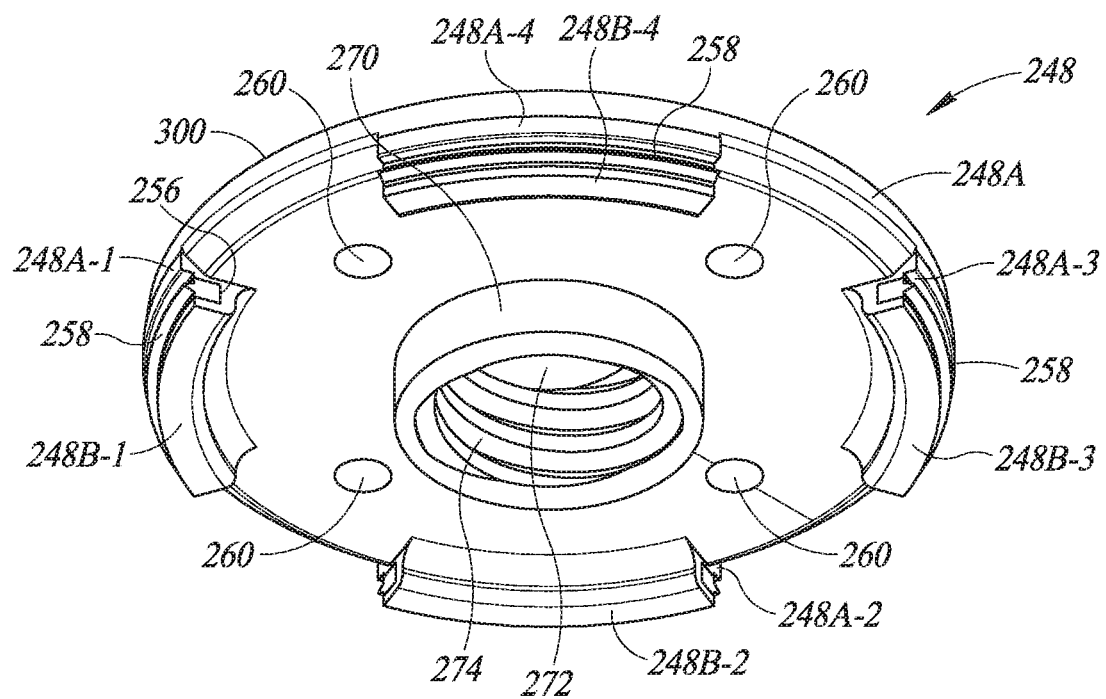
FIG. 25 is a bottom perspective exploded view of a lower member of the seal assembly of the drink container of FIG. 9.

The perimeter lower member portion 246B of the upper member 246 has a smaller diameter than the perimeter upper member portion 246A and is sized to pass by the upper edge wall 242 of the recess 240 to position the wall 254 of the perimeter middle member portion 246C inward of the recess. The ring seal 250 is shown in FIGS. 19 and 20 with the lid 214 in the second (opened) position mounted on and extending about the wall 252 of the perimeter lower member portion 246B of the upper member 246 at a vertical position directly opposite the recess 240 and inward of the recess. In this position the ring seal 250 is in an initial perimeter position and has an initial interior diameter/perimeter the same size as the exterior diameter/perimeter of the wall 252 and an initial exterior diameter/perimeter. As will be described below, the upper member 246 is movable upward and downward by the user relative to the lower member 248, and during that movement the ring seal 250 is movable upward and downward relative to the upper member 246 between the wall 252 of the perimeter lower member portion 246B and positions on the ramp wall 254 of the perimeter middle member portion 246C.

Figure 16:
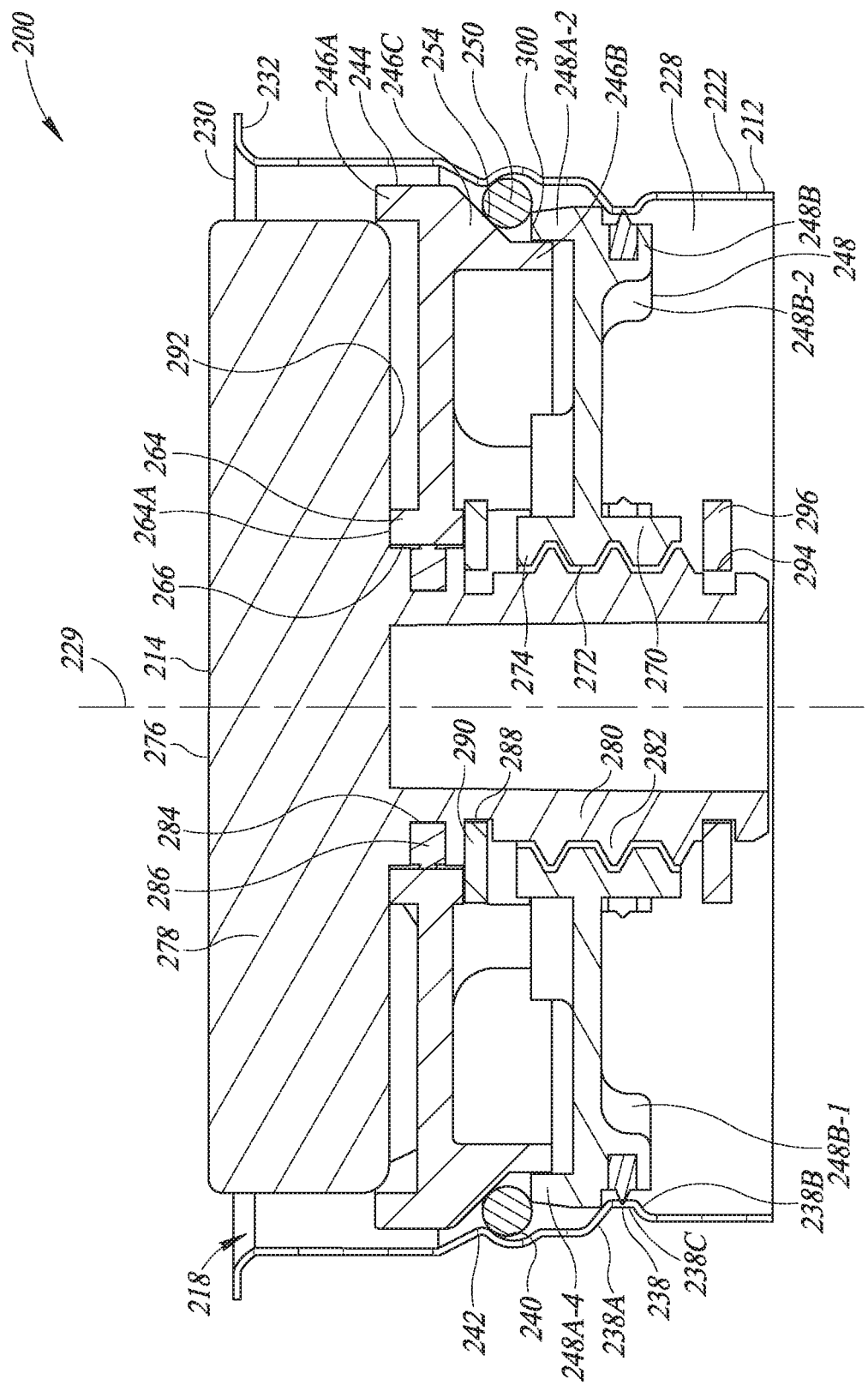
FIG. 16 is a cross-sectional view of the drink container of FIG. 9 with the plug lid in the intermediate operational position taken substantially along the line D-D of FIG. 10.
Figure 17:
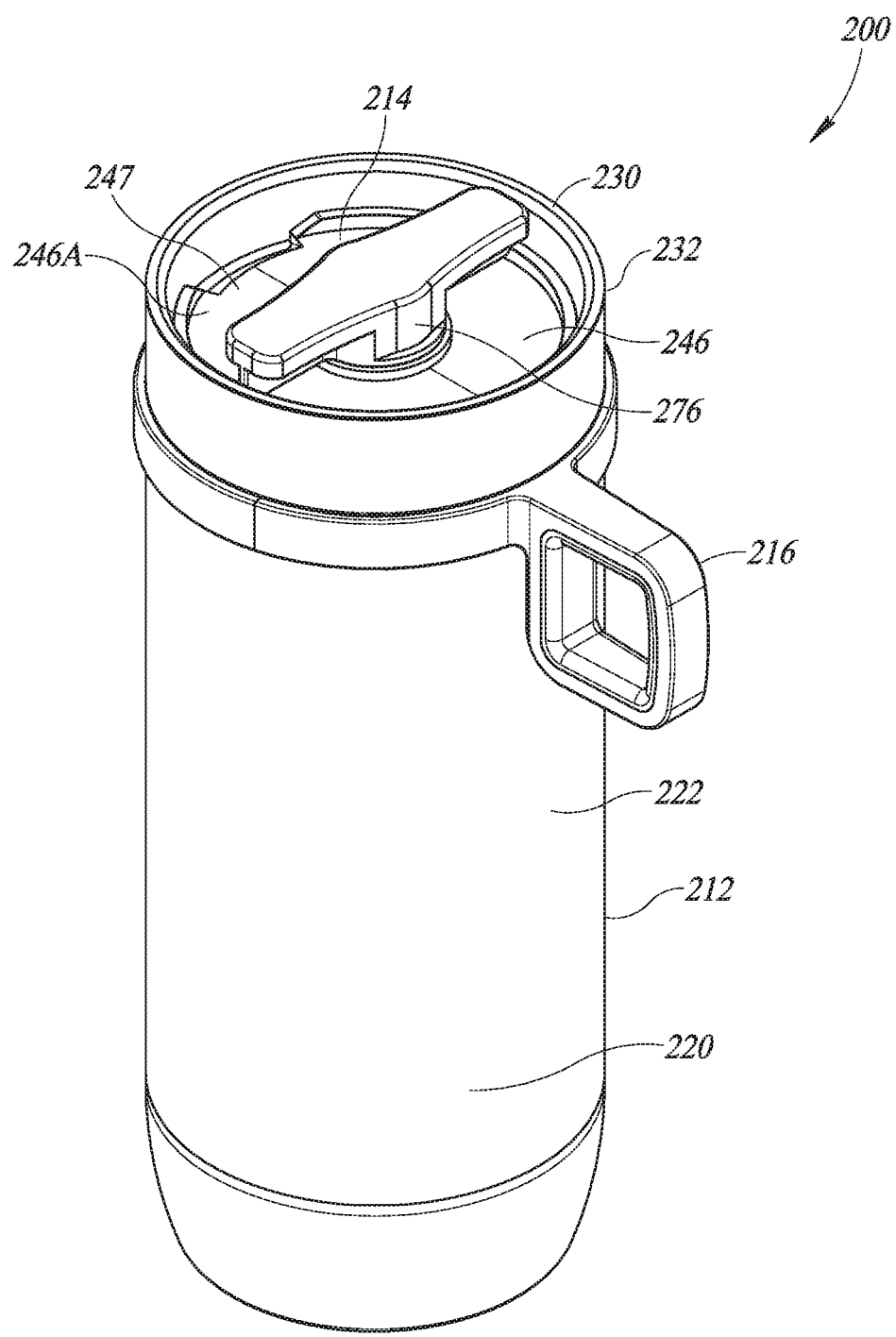
FIG. 17 is a top perspective view of the drink container of FIG. 9 with the plug lid in a closed operational position.
Figure 18:
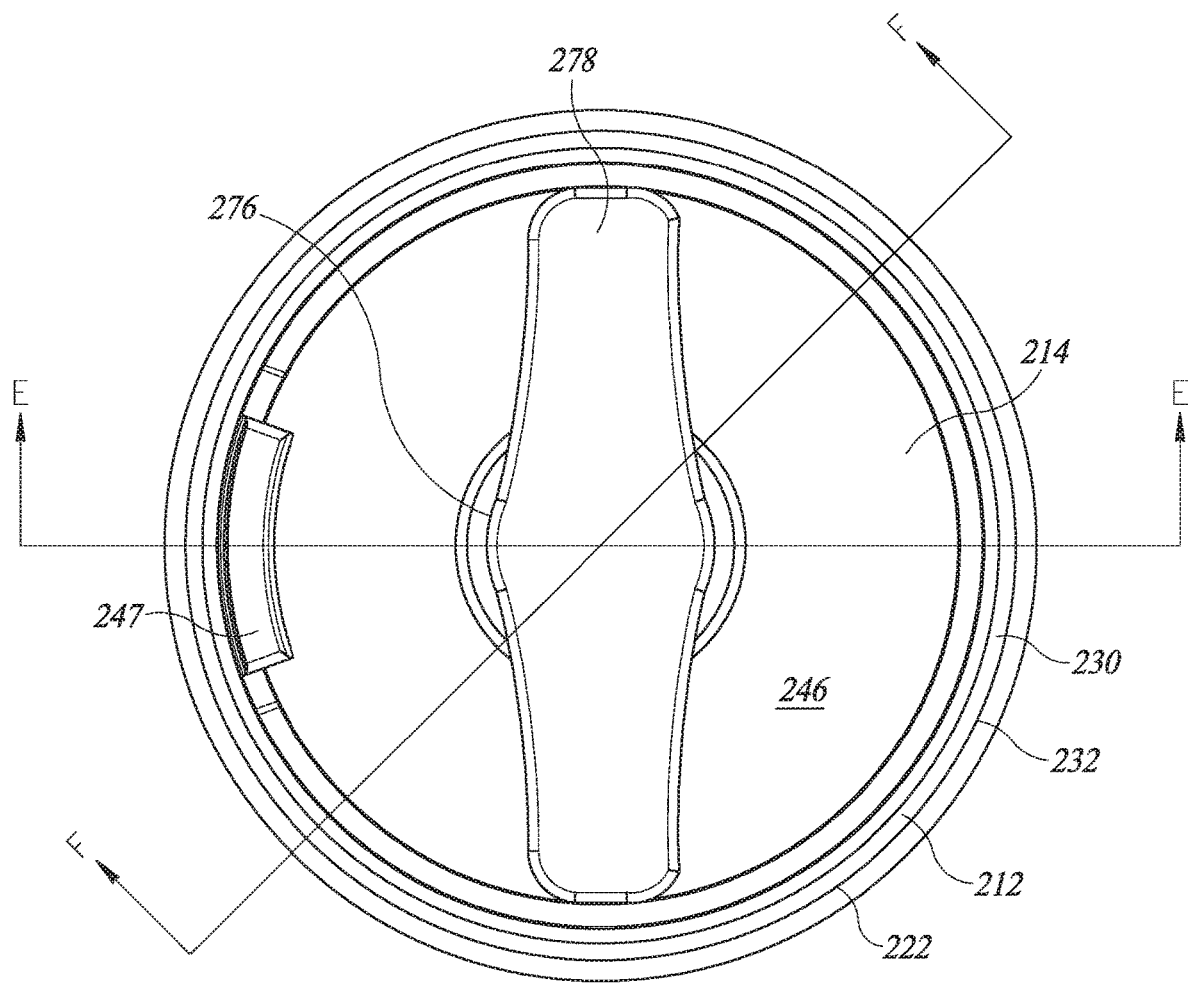
FIG. 18 is a top plan view of the drink container of FIG. 9 with the plug lid in the closed operational position.

The lower member 248 of the lid 214 has a circumferentially extending, perimeter upper member portion 248A, and a smaller diameter circumferentially extending, perimeter lower member portion 248B. The perimeter upper member portion 248A of the lower member 248 is sized to engage and be supported by the upper wall portion 238A of the body ridge 238 when the lid 214 is inserted by the user into the fluid passageway 228 through the upper end opening 230 to support the lower member 248 when within the fluid passageway and limit its downward movement. In the illustrated embodiment, the perimeter upper member portion 248A has four circumferentially extending, spaced-apart perimeter wall sections 248A-1, 248A-2, 248A-3 and 248A-4, each sized and positioned to engage and be supported by the upper wall portion 238A of the body ridge 238 when the lid 214 is inserted by the user into the fluid passageway 228, as best shown in FIGS. 12, 16 and 20.

The perimeter lower member portion 248B has a smaller diameter than the perimeter upper member portion 248A and is sized to pass by the upper wall portion 238A of the body ridge 238 and reside within the fluid passageway 228 opposite the middle wall portion 238C of the body ridge. In the illustrated embodiment, the perimeter lower member portion 248B has four circumferentially extending, spaced-apart perimeter wall sections 248B-1, 248B-2, 248B-3 and 248B-4, each having a circumferentially extending groove 256, within which is positioned a friction member 258 sized to frictionally engage the middle wall portion 238C with sufficient frictional force to resist upward movement of the lower member 248 as the lid 214 is operated to move between its first (closed) and second (opened) states, and when the drink container 200 is tilted for drinking. However, the frictional force is not so great as to prevent the user from manually moving the lower member 248 and the entire lid 214 upward for removal of the lid from the body 212 for filling the lower body portion 220 with a liquid or for washing the lid and/or the body. The spaced-apart perimeter wall sections 248B-1, 248B-2, 248B-3 and 248B-4 of the perimeter lower member 248B are positioned immediately below and coextensive with the spaced-apart perimeter wall sections 248A-1, 248A-2, 248A-3 and 248A-4 of the perimeter upper member portion 248A.

Inward of the perimeter upper member portion 248A, the lower member 248 has four circumferentially distributed apertures 260, each sized to slidably received one of four correspondingly positioned vertically oriented, elongated guide members 262 of the upper member 246 when the upper and lower members 246 and 248 are assembled. The slidable positioning of the guide members 262 in the apertures 260 prevents rotation of the upper member 246 relative to the lower member 248 as the upper member is moved upward and downward by the user relative to the lower member to move the lid 214 between its first (closed) and second (opened) states.

To provide for upward and downward movement of the upper member 246 relative to the lower member 248, the upper member has a central collar portion 264 with an axially oriented opening 266 having a smooth interior sidewall 268. The lower member 248 of the lid 214 also has a central collar portion 270 with an axially oriented opening 272, in axial alignment with the opening 266 of the upper member 246. The opening 272 has an interior wall with a screw thread 274.

The lid 214 further includes an axially oriented, manually operable actuator member 276 with a manually grippable handle 278 at an upper end thereof and with a lower end portion 280 exteriorly threaded with an exterior screw thread 282 matching the threading of the interior screw thread 274 of the opening 272 of the lower member 248. When the lid 214 is assembled, the actuator member 276 extends through the smooth sidewall opening 266 of the upper member 246 and the threaded opening 272 of the lower member 248 which threadably receives the threaded lower end portion 280 of the actuator member. An upper portion of the actuator member 276, below the handle 278 and above the threaded lower end portion 280, has a first circumferentially extending groove 284 sized to receive a ring seal 286. When the lid 214 is assembled, the seal 286 is located within the opening 266 of the upper member 246 and in fluid-tight sealing engagement with the smooth interior sidewall 268.

A second circumferentially extending groove 288 is provided in the lower end portion 280 of the actuator member 276, below the first groove 284 and above the screw thread 282 of the lower end portion, and sized to receive a first C-clip 290. When the lid 214 is assembled, the first C-clip 290 is located below the collar portion 264 of the upper member 246 to allow rotational movement of the actuator member relative to the upper member 246 and to carry the upper member upward with the actuator member when the actuator member moves upward relative to the lower member 248. The handle 278 of the actuator member 276 has a circumferentially extending lower end wall 292 positioned above the first groove 284 and in sliding engagement with an upper end 266A of the collar portion 264 of the upper member 246 when the lid 214 is assembled to allow rotational movement of the actuator member relative to the upper member 246 and to trap the collar portion 264 between the end wall and the first C-clip 290. In such manner the actuator member 276 and the upper member 246 travel upward and downward together, but the actuator member is rotatable relative to the upper member to control the position of the upper member along the longitudinal axis 229 relative to the lower member 248.

A third circumferentially extending groove 294 is provided in the lower end portion 280 of the actuator member 276 below the screw thread 282 of the lower end portion, and sized to receive a second C-clip 296. When the lid 214 is assembled, the second C-clip 296 is located below the collar portion 270 of the lower member 246 to allow rotational movement of the actuator member 276 relative to the lower member 248 while limiting the upward movement of the actuator member within the collar portion 270 resulting from rotation of the actuator member.

The first C-clip 290 and the second C-clip 296 are axially spaced apart to allow sufficient axial movement of the actuator member 276, and hence the upper member 246 which moves with the upper member, relative to the lower member 248 to move the lid 214 fully between its first (closed) and second (opened) states resulting from rotation of the actuator member 276 relative to the lower member 248. When the actuator member 276 is rotated in a first rotational direction (counter-clockwise when viewed from above in the illustrated embodiment), the threaded engagement of the actuator member screw thread 282 with the interior screw thread 274 of the lower member moves the upper member 246 upward relative to the lower member 248 and hence moves the lid 214 toward the its second (opened) state shown in FIGS. 17-20, and when the actuator member is rotated in an opposite second rotational direction (clockwise), the threaded engagement of the actuator member screw thread with the interior screw thread of the lower member moves the upper member downward relative to the lower member and hence moves the lid 214 toward the its first (closed) state shown in FIGS. 9-12. The total axial movement of the upper member 246 relative to the lower member 248 being no greater than the axial spacing between the first and second C-clips 290 and 296.

When the lid 214 is positioned within the fluid passageway 228, the upper member 246, the lower member 248, the ring seal 250 and the actuator member 272 are coaxially arranged within the fluid passageway and in axial alignment with the longitudinal axis 229. Since the body 212 in the illustrated embodiment is cylindrical, the upper member 246 and lower member 248 are generally disk shaped to correspond to the interior shape of the interior fluid passageway 228 within which the lid 214 is positioned.

The lid 214 is shown in FIGS. 17-20 in its second (opened) state with the ring seal 250 in position on the wall 252 of the perimeter lower member portion 246B of the upper member 246 in a location directly opposite and spaced inward of the recess 240 of the upper body portion 222 of the body 212. When the lid 214 is in this state, a circumferentially extending gap 298 exists between the upper body portion 222 of the body 212 and the ring seal 250, and also between the upper body portion and the upper member 246 of the seal assembly 244. Liquid in the lower body portion 220 may pass through the gap 298 when the drink container 200 is sufficiently tilted, and be dispensed through the drink dispensing aperture 247 for drinking by the user. It is noted that while the perimeter wall sections of 248B-1, 248B-2, 248B-3 and 248B-4 of the perimeter lower member 248B are in contact with the middle wall portion 238C of the body ridge 238 when the lid 214 is in its second (opened) state, the spaces between these perimeter wall sections are unobstructed and liquid in the lower body portion 220 may pass through those spaces. To achieve the second (opened) state, the actuator member 276 is rotated in the first rotational direction to move the upper member 246 axially upward away from the lower member 248.

The lid 214 is shown in FIGS. 9-12 in its first (closed) state with the ring seal 250 in a seated position in the recess 240 of the upper body portion 222 of the body 212. In this position the gap 298 is completely closed and the ring seal is in fluid-tight sealing engagement with the upper body portion 222 of the body 212, thus preventing the passage of liquid in the lower body portion 220 to the drink dispensing aperture 247 and generally to the upper end opening 230 of the interior fluid passageway 228 of the upper body portion. To achieve the first (closed) state, the actuator member 276 is rotated in the second rotational direction to move the upper member 246 axially downward closer to the lower member 248.

When the lid 214 is in its second (opened) state shown in FIGS. 17-20 with the ring seal 250 in position on the wall 252 of the perimeter lower member portion 246B of the upper member 246, the ring seal is located immediately above a circumferentially extending, upwardly facing upper end wall 300 of the perimeter upper member portion 248A of the lower member 248 and has its initial interior diameter which is the same size as the exterior diameter of the wall 252 of the upper member 246 and an initial cross-sectional size. The end wall 298 serves as a stop member to limit downward movement of the ring seal 250 as will be described below. To move the lid 214 toward the first (closed) state, the actuator member 276 is rotated in the second rotational direction which moves the upper member 246 axially downward toward the lower member 248 as a result of the threaded engagement of the actuator member screw thread 282 with the interior screw thread 274 of the lower member.

As the upper member 246 moves downward, a downward force is applied to the ring seal 250, which is positioned on the wall 252 of the perimeter lower member portion 246B of the upper member 246, to carry the ring seal downward into engagement with the upper end wall 300 of the perimeter upper member portion 248A of the lower member 248 if not already in such engagement. Engagement of the ring seal 250 with the upper end wall 300 prevents any further downward movement of the ring seal. As a result, the continued downward movement of the upper member 246 toward the lower member 248 as the ring seal 250 is held stationary moves the wall 252 downward, eventually enough to move it out of the interior of the ring seal and move a lower end portion 254A the ramp wall 254 into the interior of the ring seal.

The downward force continues to be applied by the ramp wall 254 as the upper member 246 continues to move downward. As the ramp wall 254 moves farther downward relative to the ring seal 250, a progressively larger diameter portion of the ramp wall is positioned within the interior of the ring seal, thus applying an outwardly directed radial stretching force to the ring seal which progressively stretching the ring seal radially outward from its initial perimeter position and circumferentially stretching the ring seal and increasing the ring seal's circumference/perimeter and diameter/width until eventually the ring seal is moved radially outward from its initial perimeter position to a sealing perimeter position in the recess 240 and in fluid-tight sealing engagement with the upper body portion 222 of the body 212, whereat the ring seal has a sealing interior diameter/perimeter and a sealing exterior diameter/perimeter, as well as a cross-sectional size smaller than its initial cross-sectional size. When the ring seal 250 is so positioned, the lid 214 is in its first (closed) state shown in FIGS. 9-12.

The lower member 248 has a circumferentially extending, upwardly opening recessed area 302 positioned inward of the perimeter upper member portion 248A to receive therein the perimeter lower member portion 246B of the upper member 246 as the upper member 246 moves axially downward toward the lower member 248. The recessed area 302 is sufficiently large and deep to avoid the downward movement of the perimeter lower member portion 246B from coming into engagement with the upper end wall 300 of the perimeter upper member portion 248A before the ring seal 250 is sufficiently outwardly stretched to be moved sufficiently into the recess 240 to be in fluid-tight sealing engagement with the upper body portion 222 of the body 212.

It is noted that when the user rotates the actuator member 276 in the second rotational direction to move the upper member 246 downward toward the lower member 248, and thereby move the lid 214 toward the first (closed) state, the lower member is held in a stationary position relative to the body 212 of the drink container 200 against any upward movement by the friction members 258 of the perimeter wall sections 248B-1, 248B-2, 248B-3 and 248B-4 frictionally engaging the middle wall portion 238C of the body ridge 238, as well as by the user tending to apply a downward force on the actuator member when rotating it. Additionally, it is noted that rotation of the actuator member 276 moves the upper member 246 axially relative to the stationary lower member 248 without any rotational movement of the upper member relative to the lower member as a result of the guide members 262 of the upper member being slidably received in the apertures 260 of the lower member.

When the lid 214 is in its first (closed) state shown in FIGS. 9-12 with the ring seal 250 within the recess 240 and in fluid-tight sealing engagement with the upper body portion 222 of the body 212, to move the lid toward the second (opened) state, the actuator member 276 is rotated in the first rotational direction which moves the upper member 246 axially upward away from the lower member 248, as a result of the threaded engagement of the actuator member screw thread 282 with the interior screw thread 274 of the lower member. As the upper member 246 moves upward, the ring seal 250, which is positioned within the recess 240, is at least initially prevented from moving upward with the upper member by the upper edge wall 242 of the recess which is located above the ring seal and protrudes over the ring seal and inwardly into the fluid passageway 228. As the upper member 246 moves upward relative to the ring seal 250, the ramp wall 254 extending through the interior of the ring seal also moves upward, and the farther the ramp wall moves upward the smaller the diameter of the portion of the ramp wall positioned within the interior of the ring seal which allows the outwardly stretched resilient ring seal to progressively relax radially inward and decrease its circumference and diameter until eventually the ring seal clears the upper edge wall 242 of the recess 240 and can be carried upward with the ramp wall, whereat the ring seal has returned substantially to the initial interior diameter and the initial exterior diameter, as well as to the initial cross-sectional size. In a preferred embodiment, the upper edge wall 242 of the recess 240 holds the ring seal 250 against upward movement until the upper member 246 has moved sufficiently upward to return the ring seal to a position on the wall 252 of the perimeter lower member portion 246B of the upper member 246. However, even if that does not occur and the ring seal 250 clears the upper edge wall 242 while still positioned on the ramp wall 254 and is carried slightly upward away from the upper end wall 298 of the perimeter upper member portion 248A of the lower member 248, when the user next rotates the actuator member 276 in the second rotational direction to move the upper member 246 downward, the ramp wall 254 will carry the ring seal 250 downward with it until it engages the upper end wall 300 of the perimeter upper member portion 248A of the lower member 248, thus locating the ring seal directly opposite and spaced inward of the recess 240 of the upper body portion 222 of the body 212 for again progressively outwardly stretching the ring seal outward and eventually into the fluid-tight sealing position in the recess 240.

The lid 214 is show in FIGS. 13-16 in the intermediate position through which the lid passes as it is moved between the first (closed) state shown in FIGS. 9-12 and the second (opened) state shown in FIGS. 17-20. In the illustrated intermediate position the ring seal 250 is not fully seated within the recess 240. From this intermediate position, rotation of the actuator member 276 in the first rotational direction will move the upper member 246 axially upward away from the lower member 248 and allow the ring seal 250 to relax and pull farther away from the recess 240 as the lid moves toward its second (opened) state, and rotation of the actuator member in the second rotational direction will move the upper member axially downward toward the lower member and cause the ring seal to stretch outward and move into the fluid-tight sealing position in the recess in fluid-tight sealing engagement with the upper body portion 222 of the body 212.

While the perimeter middle member portion 246C is described and illustrated as having a circumferentially extending, outward facing perimeter smooth ramp wall 254 with the shape of a conical wall section to provide a smooth and progressive expansion of the ring seal 250 from its relaxed state to its stretched state in fluid-tight sealing engagement with the upper body portion 222, it will be recognized by a person of skill in the art that the wall 254 may have other contours which stretch the ring seal as the actuator member 276 moves the upper member 246 away from the lower member 248 which do not utilize a smooth ramp wall or even a conical wall section. Such alternative shapes may be used so long as the ring seal 250 is in a sufficiently stretched state that it provided a fluid-tight sealing engagement with the upper body portion 222 when in the lid is in the first (closed) state and is sufficiently relaxed to provide the gap 298 between the upper body portion 222 of the body 212 and the ring seal 250 to permit fluid flow from the lower body portion 220 through the lid 214 to the drink aperture 247 or other portion of the lid intended to dispense the fluid.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare statement of "two recitations," without other modifiers, typically means at least two recitations, or two or more recitations).

What is claimed is:

1. A drink container, comprising:
   a container body having a lower inner body portion for containing a drink and an upper inner body portion having an interior fluid passageway with an upper end opening and a circumferentially extending body ridge positioned within the fluid passageway; and
   a lid sized to permit insertion into and removal from the fluid passageway through the upper end opening, the lid having:
      an upper seal carrier sized to engage and be supported by the body ridge when the lid is inserted into the fluid passageway, the upper seal carrier having a drink dispensing aperture;
      a lower seal carrier sized to pass by the body ridge as the lid is inserted into the fluid passageway and be positioned below the upper seal carrier;
      a flexible tubular seal member with an upper end portion attached to the upper seal carrier and a lower end portion attached to the lower seal carrier;
      a lifter member attached to the lower seal carrier; and
      a cam member movably attached to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flex the tubular seal member that the tubular seal member moves laterally outward and upward into fluid-tight sealing engagement with the body ridge to prevent drink in the lower inner body portion from being dispensed through the drink dispensing aperture when the container body is tilted, as the cam member is moved to the second operational position, the second cam engages the upper seal carrier and lifts the lifting member upward to move the lower seal carrier upward to a second position below the upper seal carrier and sufficiently flex the tubular seal member that the tubular seal member moves laterally outward in position for engagement with the body ridge to inhibit removal of the lid from the fluid passageway if moved upward toward the body ridge, but not sufficiently upward and laterally outward to place the tubular seal member in fluid-tight sealing engagement with the body ridge and allowing drink in the lower inner body portion to be dispensed through the drink dispensing aperture when the container body is tilted, the lower seal carrier being positioned farther below the upper seal carrier in the second position than in the first position, and as the cam member is moved to the third operational position, the lower seal carrier is lowered by the lifting member to a third position below the upper seal carrier whereat the tubular seal member is out of fluid-tight sealing engagement with the body ridge and not sufficiently flexed to prevent removal of the lid from the fluid passageway, the lower seal carrier being positioned farther below the upper seal carrier in the third position than in the second position.

2. The drink container of claim 1, wherein the first cam is longer than the second cam.

3. The drink container of claim 1, wherein the body has an upper end whereat the upper end opening is located, and the body ridge is located below the upper end of the body.

4. The drink container of claim 3, wherein upper and lower seal carriers are sized to pass through the upper end opening and the body ridge is located sufficiently below the upper end of the body that when the upper seal carrier is supported by the body ridge the upper seal carrier is positioned entirely below the upper end of the body.

5. The drink container of claim 1, wherein the body has an upper end whereat the upper end opening is located, and when the cam member is in the first operational position the lower end portion of the tubular seal member is in engagement with the body ridge and the upper end portion of the tubular seal member is positioned below the upper end of the body and out of engagement with the body ridge.

6. The drink container of claim 1, wherein the body has an upper end whereat the upper end opening is located, and when the cam member is in the first, second and third operational positions the upper end portion of the tubular seal member is positioned below the upper end of the body and out of engagement with the body.

7. The drink container of claim 1, wherein the upper seal carrier is positioned within the upper end portion of the tubular seal member and the lower seal carrier is positioned within the lower end portion of the tubular seal member.

8. The drink container of claim 1, wherein the lower end portion of the tubular seal member is in fluid-tight sealing engagement with the lower seal carrier.

9. The drink container of claim 8, wherein the upper end portion of the tubular seal member is in fluid-tight sealing engagement with the upper seal carrier.

10. The drink container of claim 1, wherein the upper seal carrier has an upper seal carrier aperture, the lifter member has a lifter member upper end portion extending through the upper seal carrier aperture to above the upper seal carrier, and the cam member is movably attached to the lifter member upper end portion at a location above the upper seal carrier.

11. The drink container of claim 10, wherein the upper seal carrier has an upper surface, and the first cam cammingly engages the upper surface of the upper seal carrier as the cam member is moved to the first operational position and the second cam cammingly engages the upper surface of the upper seal carrier as the cam member is moved to second operational position.

12. The drink container of claim 10, wherein the cam member includes a handle portion positioned above the upper seal carrier and first and second cam portions attached to the handle portion for rotation therewith, the handle portion being movable by a user to move the cam member between the first, second and third operational positions, the lifter member upper end portion being positioned between the first and second cam portions, the first cam comprising a first pair of spaced apart cams and the second cam comprises a second pair of spaced cams, each of the first and second cam portions having one of the first pair of cams attached thereto and extending in a first direction, and each of the first and second cam portions having one of the second pair of cams attached thereto and extending in a second direction different than the first direction.

13. The drink container of claim 12, wherein the first cams are longer than the second cams.

14. The drink container of claim 10, wherein the cam member is rotatably attached to the lifter member upper end portion and rotatable relative to the lifter member upper end portion to move the cam member between the first, second and third operational positions.

15. The drink container of claim 1, wherein the cam member includes a handle portion positioned above the upper seal carrier and at the upper end opening of the container body, the handle portion being movable by a user to move the cam member between the first, second and third operational positions.

16. The drink container of claim 15, wherein the handle portion is rotatably attached to the lifter member upper end portion and rotatable relative to the lifter member upper end portion, the handle portion being rotatable in a first rotational direction to move the handle portion to a first rotational position whereat the cam member is in the first operational position and rotatable in a second rotational direction opposite the first rotational direction to move the handle portion to a second rotational position whereat the cam member is in the second operational position.

17. The drink container of claim 16, wherein the handle portion is rotatable to move the handle portion to a third rotational position located between the first and second rotational positions and whereat the cam member is in the third operational position.

18. The drink container of claim 15, wherein the first and second cams extend in different directions, with movement of the handle portion to the first operational position rotating the first cam when in engagement with the upper seal carrier to lift the lifting member upward to move the lower seal carrier to the first position, while the second cam is out of engagement with the upper seal carrier, and with movement of the handle portion to the second operational position rotating the second cam when in engagement with the upper seal carrier to lift the lifting member upward to move the lower seal carrier to the second position, while the first cam is out of engagement with the upper seal carrier.

19. The drink container of claim 18, wherein the first cam is longer than the second cam.

20. The drink container of claim 1, wherein the upper seal carrier has an upper surface, and the first cam engages the upper surface of the upper seal carrier and the second cam remains out of engagement with the upper surface of the upper seal carrier when the cam member is moved to the first operational position, and the second cam engages the upper surface of the upper seal carrier and the first cam remains out of engagement with the upper surface of the upper seal carrier when the cam member is moved to the second operational position.

21. The drink container of claim 1, wherein the tubular seal member has a perimeter wall and a hollow interior space located within the perimeter wall extending fully between the upper and lower end portions of the tubular seal member, and the lifter member is positioned inward of the perimeter wall within the hollow interior space out of contact with the tubular seal member.

22. The drink container of claim 21, wherein the hollow interior space spans a substantial portion of the interior cross-sectional area of the interior fluid passageway.

23. The drink container of claim 1, wherein the drink dispensing aperture is located below the upper end opening.

24. The drink container of claim 1, wherein the upper seal carrier has a perimeter sidewall with a perimeter sidewall recess defining the drink dispensing aperture.

25. The drink container of claim 1, wherein the body ridge extends circumferentially fully about the fluid passageway.

26. The drink container of claim 25, wherein the body ridge has a circumferentially extending upper wall portion which slopes downward in the inward direction, and a circumferentially extending lower wall portion which slopes upward in the inward direction.

27. The drink container of claim 26, wherein the cam member is in the first operational position, the tubular seal member is in fluid-tight engagement with the lower wall portion of the body ridge.

28. A drink container, comprising:
a container body having an upper inner body portion defining an interior fluid passageway with an upper end opening and a stop positioned within the fluid passageway; and
a lid sized to permit insertion into and removal from the fluid passageway through the upper end opening, the lid having:
an upper seal carrier sized to engage and be supported by the stop when the lid is inserted into the fluid passageway, the upper seal carrier having a drink dispensing aperture;
a lower seal carrier sized to pass by the stop as the lid is inserted into the fluid passageway and be positioned below the upper seal carrier;
a seal having a flexible perimeter seal wall with an interior space located within the perimeter seal wall, the seal having an upper end portion attached to the upper seal carrier and a lower end portion attached to the lower seal carrier;
a lifter member operatively connected to the lower seal carrier; and
a cam member operatively connected to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flexes the perimeter seal wall that the perimeter seal wall moves laterally outward and upward into fluid-tight sealing engagement with the upper inner body portion to prevent drink in the container body below the upper inner body portion from being dispensed through the drink dispensing aperture when the container body is tilted, as the cam member is moved to the second operational position, the second cam engages the upper seal carrier and lifts the lifting member upward to move the lower seal carrier upward to a second position below the upper seal carrier and sufficiently flexes the perimeter seal wall that the perimeter seal wall moves laterally outward in position for engagement with the upper inner body portion to inhibit removal of the lid from the fluid passageway if moved upward toward the stop, but not sufficiently upward and laterally outward to place the perimeter seal wall in fluid-tight sealing engagement with the upper inner body portion and allowing drink in the container body below the upper inner body portion to be dispensed through the drink dispensing aperture when the container body is tilted, the lower seal carrier being positioned farther below the upper seal carrier in the second position than in the first position, and as the cam member is moved to the third operational position, the lower seal carrier is lowered by the lifting member to a third position below the upper seal carrier whereat the perimeter seal wall is out of fluid-tight sealing engagement with the upper inner body portion and not sufficiently flexed to prevent removal of the lid from the fluid passageway, the lower seal carrier being positioned farther below the upper seal carrier in the third position than in the second position.

29. A drink container, comprising:
a container body having an inner body portion defining an interior fluid passageway with an upper end opening; and
a lid sized to permit insertion into and removal from the fluid passageway through the upper end opening, the lid having:
   an upper seal carrier positioned within the fluid passageway, the upper seal carrier having a drink dispensing aperture;
   a lower seal carrier positioned within the fluid passageway and axially movable within the fluid passageway, the lower seal carrier being positioned below the upper seal carrier;
   a seal having a flexible perimeter seal wall, the seal having an upper end portion attached to the upper seal carrier and a lower end portion attached to the lower seal carrier;
   a lifter member attached to the lower seal carrier; and
   a cam member operatively connected to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flexes the perimeter seal wall that the perimeter seal wall moves laterally outward into fluid-tight sealing engagement with the inner body portion to prevent drink in the inner body portion from being dispensed through the drink dispensing aperture when the container body is tilted, as the cam member is moved to the second operational position, the second cam engages the upper seal carrier and lifts the lifting member upward to move the lower seal carrier upward to a second position below the upper seal carrier and sufficiently flexes the perimeter seal wall that the perimeter seal wall moves laterally outward in position to engage with the inner body portion to inhibit removal of the lid from the fluid passageway if moved upward toward the upper end opening, but not sufficiently laterally outward to place the perimeter seal wall in fluid-tight sealing engagement with the inner body portion and allowing drink in the inner body portion to be dispensed through the drink dispensing aperture when the container body is tilted, the lower seal carrier being positioned farther below the upper seal carrier in the second position than in the first position, and as the cam member is moved to the third operational position, the lower seal carrier is lowered by the lifting member to a third position below the upper seal carrier whereat the perimeter seal wall is out of fluid-tight sealing engagement with the inner body portion and not sufficiently flexed to prevent removal of the lid from the fluid passageway, the lower seal carrier being positioned farther below the upper seal carrier in the third position than in the second position.

30. A drink container, comprising:
a container body having an inner body portion defining an interior fluid passageway with an upper end opening; and
a lid sized to permit insertion into and removal from the fluid passageway through the upper end opening, the lid having:
   an upper seal carrier positioned within the fluid passageway, the upper seal carrier having a drink dispensing aperture;
   a lower seal carrier positioned within the fluid passageway and axially movable within the fluid passageway, the lower seal carrier being positioned below the upper seal carrier;
   a seal having a flexible perimeter seal wall, the seal having an upper end portion attached to the upper seal carrier and a lower end portion attached to the lower seal carrier;
   a lifter member attached to the lower seal carrier; and
   a cam member operatively connected to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flexes the perimeter seal wall that the perimeter seal wall moves laterally outward into fluid-tight sealing engagement with the inner body portion, when the first cam moves the perimeter seal wall into fluid-tight sealing engagement with the inner body portion, drink in the container body below the upper seal carrier is prevented from being dispensed through the drink dispensing aperture when the container body is tilted, as the cam member is moved to the second operational position, the second cam engages the upper seal carrier and lifts the lifting member upward to move the lower seal carrier upward to a second position below the upper seal carrier and sufficiently flexes the perimeter seal wall that the perimeter seal wall moves laterally outward in position to engage with the inner body portion to inhibit removal of the lid from the fluid passageway if moved upward toward the upper end opening, but not sufficiently laterally outward to place the perimeter seal wall in fluid-tight sealing engagement with the inner body portion, the lower seal carrier being positioned farther below the upper seal carrier in the second position than in the first position, and as the cam member is moved to the third operational position, the lower seal carrier is lowered by the lifting member to a third position below the upper seal carrier whereat the perimeter seal wall is out of fluid-tight sealing engagement with the inner body portion and not sufficiently flexed to prevent removal of the lid from the fluid passageway, the lower seal carrier being positioned farther below the upper seal carrier in the third position than in the second position.

31. The drink container of claim 29, wherein the cam member includes a handle portion positioned above the upper seal carrier and at the upper end opening of the container body, the handle portion being movable by a user to move the cam member between the first, second and third operational positions.

32. The drink container of claim 31, wherein the handle portion is rotatably attached to a lifter member upper end portion and rotatable relative to the lifter member upper end portion, the handle portion being rotatable in a first rotational direction to move the handle portion to a first rotational position whereat the cam member is in the first operational position and rotatable in a second rotational direction opposite the first rotational direction to move the handle portion to a second rotational position whereat the cam member is in the second operational position.

33. The drink container of claim 32, wherein the handle portion is rotatable to move the handle portion to a third rotational position located between the first and second rotational positions and whereat the cam member is in the third operational position.

34. A drink container, comprising:
a container body having an inner body portion defining an interior fluid passageway with an upper end opening; and
a lid sized to permit insertion into and removal from the fluid passageway through the upper end opening, the lid having:
an upper seal carrier positioned within the fluid passageway;
a lower seal carrier positioned within the fluid passageway and axially movable within the fluid passageway, the lower seal carrier being positioned below the upper seal carrier;
a seal having a flexible perimeter seal wall, the seal having an upper end portion attached to the upper seal carrier and a lower end portion attached to the lower seal carrier;
a lifter member attached to the lower seal carrier; and
a cam member operatively connected to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flexes the perimeter seal wall that the perimeter seal wall moves laterally outward into fluid-tight sealing engagement with the inner body portion, as the cam member is moved to the second operational position, the second cam engages the upper seal carrier and lifts the lifting member upward to move the lower seal carrier upward to a second position below the upper seal carrier and sufficiently flexes the perimeter seal wall that the perimeter seal wall moves laterally outward in position to engage with the inner body portion to inhibit removal of the lid from the fluid passageway if moved upward toward the upper end opening, but not sufficiently laterally outward to place the perimeter seal wall in fluid-tight sealing engagement with the inner body portion, the lower seal carrier being positioned farther below the upper seal carrier in the second position than in the first position, and as the cam member is moved to the third operational position, the lower seal carrier is lowered by the lifting member to a third position below the upper seal carrier whereat the perimeter seal wall is out of fluid-tight sealing engagement with the inner body portion and not sufficiently flexed to prevent removal of the lid from the fluid passageway, the lower seal carrier being positioned farther below the upper seal carrier in the third position than in the second position, wherein the cam member includes a handle portion positioned above the upper seal carrier and at the upper end opening of the container body, the handle portion being movable by a user to move the cam member between the first, second and third operational positions, and wherein the first and second cams extend in different directions, with movement of the handle portion to the first operational position rotating the first cam when in engagement with the upper seal carrier to lift the lifting member upward to move the lower seal carrier to the first position with the second cam being out of engagement with the upper seal carrier, and with movement of the handle portion to the second operational position rotating the second cam when in engagement with the upper seal carrier to lift the lifting member upward to move the lower seal carrier to the second position with the first cam being out of engagement with the upper seal carrier.

35. The drink container of claim 34, wherein the first cam is longer than the second cam.

36. The drink container of claim 34, wherein the upper seal carrier has an upper surface, and the first cam engages the upper surface of the upper seal carrier when the cam member is moved to the first operational position and the second cam engages the upper surface when the cam member is moved to the second operational position.

37. A lid for use with a drink container body having an interior fluid passageway with an upper end opening and a stop positioned within the fluid passageway, comprising:
an upper seal carrier sized to engage and be supported by the stop when the lid is inserted into the fluid passageway through the upper end opening, the upper seal carrier having a drink dispensing aperture;
a lower seal carrier sized to pass by the stop as the lid is inserted into the fluid passageway through the upper end opening and be positioned below the upper seal carrier;
a seal having a flexible perimeter seal wall with an interior space located within the perimeter seal wall, the seal having an upper end portion attached to the upper seal carrier and a lower end portion attached to the lower seal carrier;
a lifter member operatively connected to the lower seal carrier; and
a cam member operatively connected to the lifter member, the cam member having first and second cams, the cam member being movable to first, second and third operational positions, as the cam member is moved to the first operational position, the first cam engages the upper seal carrier and lifts the lifting member upward to move the lower seal carrier upward to a first position below the upper seal carrier and sufficiently flexes the perimeter seal wall that the perimeter seal wall moves laterally outward into fluid-tight sealing engagement with the stop when the lid is positioned in the fluid passageway to prevent drink in the container body from being dispensed through the drink dispensing aperture when the container body is tilted, as the cam member is moved to the second operational position, the second cam engages the upper seal carrier and lifts the lifting member upward to move the lower seal carrier upward to a second position below the upper seal carrier and sufficiently flex the perimeter seal wall that the perimeter seal wall moves laterally outward in position to engage with the stop when the lid is positioned in the fluid passageway to inhibit removal of the lid from the fluid passageway if moved upward toward the stop, but not sufficiently laterally outward to place the perimeter seal wall in fluid-tight sealing engagement with the stop and allowing drink in the container body to be dispensed through the drink dispensing aperture when the container body is tilted, the lower seal carrier being positioned farther below the upper seal carrier in the second position than in the first position, and as the cam member is moved to the third operational position, the lower seal carrier is lowered by the lifting member to a third position below the upper seal carrier whereat when the lid is positioned in the fluid passageway the perimeter seal wall is positioned out of fluid-tight sealing engagement with the stop and not sufficiently flexed to prevent removal of the lid from the fluid passageway, the lower seal carrier being positioned farther below the upper seal carrier in the third position than in the second position.

38. A lid for use with a drink container body having an inner body portion defining an interior fluid passageway with an upper end opening, comprising:
    an first seal carrier positionable within the fluid passageway through the upper end opening;
    a second seal carrier positionable within the fluid passageway through the upper end opening, at least one of the first and second seal carriers having a drink dispensing aperture;
    a seal having a flexible perimeter seal wall with an interior space located within the perimeter seal wall, the seal having a first end portion attached to the first seal carrier and a second end portion attached to the second seal carrier; and
    a cam member operatively connected to at least one of the first and second seal carriers to move the perimeter seal wall to first and second operational positions, as the cam member is moved to the first operational position, the perimeter seal wall is sufficiently flexed so that the perimeter seal wall is in fluid-tight sealing engagement with the inner body portion when the lid is positioned in the fluid passageway such that drink in the inner body portion is prevented from being dispensed through the drink dispensing aperture when the container body is tilted, and as the cam member is moved to the second operational position, the perimeter seal wall is sufficiently flexed to be in position to engage with the inner body portion when the lid is positioned in the fluid passageway to inhibit removal of the lid from the fluid passageway if moved upward toward the upward end opening, but not sufficiently flexed to place the perimeter seal wall in fluid-tight sealing engagement with the inner body portion.

39. The lid of claim 38, wherein the cam member is movable to a third operational position, and as the cam member is moved to the third operational position, the perimeter seal wall is positioned out of fluid-tight sealing engagement with the inner body portion and not sufficiently flexed to prevent removal of the lid from the fluid passageway when the lid is positioned in the fluid passageway.

40. A lid for use with a drink container body having an inner body portion defining an interior fluid passageway with an upper end opening, comprising:
    an first seal carrier positionable within the fluid passageway through the upper end opening and having a drink dispensing aperture;
    a second seal carrier positionable within the fluid passageway through the upper end opening, the second seal carrier being positioned within the fluid passageway below the first seal carrier;
    a seal having a flexible perimeter seal wall with an interior space located within the perimeter seal wall, the seal having a first end portion attached to the first seal carrier and a second end portion attached to the second seal carrier; and
    a cam member movable to first and second operational positions, the cam member being operatively connected to at least one of the first and second seal carriers to move the perimeter seal wall to first and second positions, as the cam member is moved to the first operational position, the cam member moves the perimeter seal wall to the first position whereat the perimeter seal wall is sufficiently flexed to be in fluid-tight sealing engagement with the inner body portion when the lid is positioned in the fluid passageway such that drink in the inner body portion is prevented from being dispensed through the drink dispensing aperture when the container body is tilted, and as the cam member is moved to the second operational position, the cam member moves the perimeter seal wall to the second position whereat the perimeter seal wall is sufficiently flexed to be in position to engage with the inner body portion when the lid is positioned in the fluid passageway to inhibit removal of the lid from the fluid passageway if moved upward toward the upward end opening, but not sufficiently flexed to place the perimeter seal wall in fluid-tight sealing engagement with the inner body portion or prevent drink in the inner body portion from being dispensed through the drink dispensing aperture when the container body is tilted.

41. The lid of claim 40, wherein the cam member is movable to a third operational position, and as the cam member is moved to the third operational position, the cam member moves the perimeter seal wall to a third position whereat the perimeter seal wall is positioned out of fluid-tight sealing engagement with the inner body portion and not sufficiently flexed to prevent removal of the lid from the fluid passageway when the lid is positioned in the fluid passageway.

42. The lid of claim 40, wherein the drink dispensing aperture is an inwardly recessed region at the perimeter of the first seal carrier through which liquid may pass for drinking when the container body is tilted.

43. The drink container of claim 29, wherein the drink dispensing aperture is an inwardly recessed region at the perimeter of the upper seal carrier through which liquid may pass for drinking when the container body is tilted.

44. The drink container of claim 1, wherein the flexible tubular seal member has a perimeter sidewall and a hollow interior space located within the perimeter sidewall, the sidewall extending the full length of the tubular seal member upper and lower end portions, the interior space spanning at least 93% of the interior cross-sectional area of the fluid passageway, and spanning at least 50% of the interior cross-sectional area of the fluid passageway.

45. The drink container of claim 1, wherein the upper inner body portion has an upper interior wall surface, and the upper seal carrier has an upper portion with a perimeter sidewall and a smaller diameter lower portion, when the lid is positioned within the fluid passageway, the perimeter sidewall of the upper portion of the upper seal carrier is positioned adjacent to the upper interior wall surface portion of the upper inner body portion, the upper portion of the upper seal carrier being sized to engage and be supported by the body ridge when the lid is inserted into the fluid passageway through the upper end opening, and the smaller lower portion is sized to pass by the body ridge and reside within the fluid passageway below the body ridge.

46. The drink container of claim 45, wherein the container body has drinking lip at the upper end opening and the upper portion of the upper seal carrier is positioned fully below the drinking lip and above the body ridge to define a drink well above the upper portion of the upper seal carrier, the drink dispensing aperture being in the upper portion of the upper seal carrier, when the cam member moves the lower seal carrier to the second position with the tubular seal member out of fluid-tight sealing engagement with the body ridge, drink in the container body below the upper seal carrier is permitted to be dispensed through the drink dispensing aperture and into the drink well for drinking by a user when the container body is tilted.

47. A drink container, comprising:
a container body having an inner body portion defining an interior fluid passageway with an upper end opening; and
a lid sized to permit insertion into and removal from the fluid passageway through the upper end opening, the lid having:
an upper member positioned within the fluid passageway and having a drink dispensing aperture;
a lower member positioned within the fluid passageway in position below the upper member;
a seal having a flexible perimeter seal wall, the seal having an upper end portion attached to the upper member and a lower end portion attached to the lower member; and
a cam member movable to first and second operational positions, as the cam member is moved to the first operational position, the cam member moves the lower member to a first position below the upper member and sufficiently flexes the perimeter seal wall so that the perimeter seal wall moves laterally outward into fluid-tight sealing engagement with the inner body portion, and as the cam member is moved to the second operational position, the cam member moves the lower member to a second position below the upper member and sufficiently flexes the perimeter seal wall so that the perimeter seal wall moves laterally outward into engagement with the inner body portion to inhibit removal of the lid from the fluid passageway if moved upward toward the upper end opening, but not sufficiently laterally outward to place the perimeter seal wall in fluid-tight sealing engagement with the inner body portion, the lower member being positioned farther below the upper member when in the second position than in the first position, when the cam member moves the perimeter seal wall to the first position in fluid-tight sealing engagement with the inner body portion, drink in the container body below the upper member is prevented from being dispensed through the drink dispensing aperture when the container body is tilted.

48. The drink container of claim 47, wherein the cam member is movable to a third operational position, and as the cam member is moved to the third operational position, the cam member moves the lower member to a third position below the upper member whereat the perimeter seal wall is positioned out of fluid-tight sealing engagement with the inner body portion and not sufficiently flexed to prevent removal of the lid from the fluid passageway, the lower member being positioned farther below the upper member when in the third position than in the first and second positions.

49. The drink container of claim 47, wherein the perimeter seal wall has a hollow interior space located within the perimeter seal wall, the interior space spanning at least 93% of the interior cross-sectional area of the fluid passageway, and spanning at least 50% of the interior cross-sectional area of the fluid passageway.

50. The drink container of claim 47, wherein the inner body portion of the container body includes a body ridge and an upper inner body portion with an upper interior wall surface, and the upper member has an upper portion with a perimeter sidewall and a smaller diameter lower portion, when the lid is positioned within the fluid passageway, the perimeter sidewall of the upper portion of the upper member is positioned adjacent to the upper interior wall surface portion of the upper inner body portion, the upper portion of the upper member being sized to engage and be supported by the body ridge when the lid is inserted into the fluid passageway through the upper end opening, and the smaller lower portion is sized to pass by the body ridge and reside within the fluid passageway below the body ridge.

51. The drink container of claim 50, wherein the container body has a drinking lip at the upper end opening and the upper portion of the upper member is positioned fully below the drinking lip and above the body ridge to define a drink well above the upper portion of the upper member, the drink dispensing aperture being in the upper portion of the upper member, when the cam member moves the lower member to the second position with the perimeter seal wall out of fluid-tight sealing engagement with the inner body portion, drink in the container body below the upper member is permitted to be dispensed through the drink dispensing aperture and into the drink well for drinking by a user when the container body is tilted.

52. The drink container of claim 47, wherein the cam member has first and second cams, as the cam member is moved to the first operational position, the first cam moves the lower member to the first position below the upper member, and as the cam member is moved to the second operational position, the second cam moves the lower member to the second position below the upper member.

53. The drink container of claim 52, wherein the first and second cams extend in different directions, with movement of the cam member to the first operational position moving the first cam into engagement with the upper member to move the lower member to the first position with the second cam being out of engagement with the upper member, and with movement of the cam member to the second operational position moving the second cam into engagement with the upper member to move the lower member to the second position with the first cam being out of engagement with the upper member.

54. The drink container of claim 52, wherein the first cam is longer than the second cam.

55. The drink container of claim 52, wherein the upper member has an upper surface, and the first cam engages the upper surface of the upper member when the cam member is moved to the first operational position and the second cam engages the upper surface when the cam member is moved to the second operational position.

\* \* \* \* \*